US011954911B2

(12) United States Patent
Yakuwa

(10) Patent No.: US 11,954,911 B2
(45) Date of Patent: Apr. 9, 2024

(54) FIXED STATE INSPECTION APPARATUS, FIXED STATE INSPECTION SYSTEM, FIXED STATE INSPECTION METHOD, AND A NON-TRANSITORY COMPUTER READABLE MEDIUM

(71) Applicant: NEC Corporation, Tokyo (JP)

(72) Inventor: Rina Yakuwa, Tokyo (JP)

(73) Assignee: NEC CORPORATION, Tokyo (JP)

(*) Notice: Subject to any disclaimer, the term of this patent is extended or adjusted under 35 U.S.C. 154(b) by 266 days.

(21) Appl. No.: 17/352,442

(22) Filed: Jun. 21, 2021

(65) Prior Publication Data

US 2021/0397850 A1 Dec. 23, 2021

(30) Foreign Application Priority Data

Jun. 19, 2020 (JP) .................................. 2020-10572

(51) Int. Cl.
*G06V 20/40* (2022.01)
*G06T 7/246* (2017.01)
*G06T 7/70* (2017.01)

(52) U.S. Cl.
CPC .............. *G06V 20/47* (2022.01); *G06T 7/246* (2017.01); *G06T 7/70* (2017.01); *G06T 2207/10021* (2013.01); *G06T 2207/30192* (2013.01); *G06T 2207/30252* (2013.01); *G06V 2201/07* (2022.01); *G06V 2201/08* (2022.01)

(58) Field of Classification Search
None
See application file for complete search history.

(56) References Cited

U.S. PATENT DOCUMENTS

2010/0251924 A1* 10/2010 Taylor ...................... B61D 7/30
105/286
2016/0078899 A1* 3/2016 Tokutake ............ G06F 3/04842
386/241
2020/0349498 A1* 11/2020 Brooks ................... G06F 18/21

FOREIGN PATENT DOCUMENTS

| JP | 2002-170099 A | | 6/2002 |
|---|---|---|---|
| JP | 2002170099 A | * | 6/2002 |
| JP | 2009268065 A | * | 11/2009 |
| JP | 2010-138567 A | | 6/2010 |
| JP | 2019-095358 A | | 6/2019 |
| JP | 2019095358 A | * | 6/2019 |
| KR | 20160141570 A | * | 12/2016 |

(Continued)

*Primary Examiner* — Delomia L Gilliard
(74) *Attorney, Agent, or Firm* — Sughrue Mion, PLLC

(57) ABSTRACT

For enabling safer operation of freight trains, a fixed state inspection apparatus includes: a frame image group acquisition unit acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members; a detection unit detecting the fixing mechanism in an unfixed state different from the fixed state in the freight train, based on the frame image group information; and an output unit generating and outputting detection position information being information allowing determination of a position of the detected fixing mechanism in the freight train, based on a detection frame image being a frame image including the detected fixing mechanism.

20 Claims, 27 Drawing Sheets

(56) References Cited

FOREIGN PATENT DOCUMENTS

KR            101720727 B1 *   4/2017
WO    WO-2022130488 A1 *   6/2022

\* cited by examiner

FIG. 12

| FRAME IDENTIFICATION INFORMATION | AREA | | | |
|---|---|---|---|---|
| FR1 | (XA1, YA1) | (XB1, YB1) | (XC1, YC1) | (XD1, YD1) |
| FR2 | (XA2, YA2) | (XB2, YB2) | (XC2, YC2) | (XD2, YD2) |
| FR3 | (XA3, YA3) | (XB3, YB3) | (XC3, YC3) | (XD3, YD3) |
| ... | | | | |
| FR9 | (XA9, YA9) | (XB9, YB9) | (XC9, YC9) | (XD9, YD9) |
| FR10 | (XA10, YA10) | (XB10, YB10) | (XC10, YC10) | (XD10, YD10) |

FRAME ARA INFORMATION

FIG. 17

| FRAME-CAR INFORMATION | |
|---|---|
| FRAME IDENTIFICATION INFORMATION | CAR NUMBER |
| FR1 | 1 |
| FR2 | 1 |
| FR3 | 2 |
| ... | ... |
| FR9 | 5 |
| FR10 | 5 |

FIXED STATE INSPECTION APPARATUS, FIXED STATE INSPECTION SYSTEM, FIXED STATE INSPECTION METHOD, AND A NON-TRANSITORY COMPUTER READABLE MEDIUM

TECHNICAL FIELD

The present invention relates to a fixed state inspection apparatus, a fixed state inspection system, a fixed state inspection method, and a non-transitory computer readable medium.

BACKGROUND ART

It is often the case in a freight train that many cars are coupled, and one or a plurality of containers are loaded on each car. Then, for example, one or a plurality of securing apparatuses for fixing a container accommodating freight to a flatcar are provided for each container in order to prevent the container from falling from the flatcar.

The securing apparatus can switch between a fixed state in which a container is fixed to a flatcar and a released state in which a container can be attached to and detached from a flatcar by, for example, operating a control lever. Therefore, whether the securing apparatus is in the fixed state can be often determined from an appearance of the securing apparatus, such as a state of the control lever. An operator normally confirms that a securing apparatus is in the fixed state by visual observation before a freight train starts.

For example, PTLs 1 to 3 disclose technologies supporting visual inspection of a freight train and a freight car, and a locking check of a window.

PTL 1 (Japanese Patent Application Publication No. 2019-095358) describes a technology of synthesizing a two-dimensional captured image of a railway car by joining pieces of image data acquired by continuous image capture with a line scan camera. Then, in PTL 1, abnormalities such as a side wall of a railway car having a flaw and doors of various enclosures being about to open are detected by comparing the captured image with a past normal image of the same car.

PTL 2 (Japanese Patent Application Publication No. 2010-138567) describes a window with a locking check function including a locking apparatus setting a window sash to a blocked state, an image capture unit capable of capturing an image of the locking apparatus, and a transmission cable transmitting video image data captured by the image capture unit to an external image processing apparatus. In the image processing apparatus, a video image included in the video image data is output to a monitoring apparatus. Locking of the locking apparatus is checked by whether a head end of a handle or a top surface of a hook of the locking apparatus appears in the video image, or the like.

PTL 3 (Japanese Patent Application Publication No. 2002-170099) describes a system detecting damage to the top surface of a container attached to a container truck, based on an image captured by a line camera.

SUMMARY

The technologies in PTLs 1 to 3 do not disclose a technology of automatically detecting whether a fixing mechanism such as the aforementioned securing apparatus, that is, a mechanism being provided in association with a container and being able to switch between a fixed state and a released state between members is in the fixed state.

As described above, it is often the case in a freight train that many cars are coupled, and an operation of visually checking states of securing apparatuses is very time-consuming. Further, a securing apparatus in an unfixed state may be overlooked in a check by visual observation particularly in the nighttime, a bad weather, or the like. A fixing mechanism such as a securing apparatus traveling in the unfixed state may pose a danger, and therefore a technology for automatically detecting the state of a fixing mechanism such as a securing apparatus is desired.

The present invention has been made in view of the aforementioned circumstances, and an object thereof is to enable safer operation of freight trains.

In order to achieve the aforementioned object, a fixed state inspection apparatus according to a first aspect of the present invention includes:

a frame image group acquisition means for acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;

a detection means for detecting the fixing mechanism in an unfixed state different from the fixed state in the freight train, based on the frame image group information; and an output means for generating and outputting detection position information being information allowing determination of a position of the detected fixing mechanism in the freight train, based on a detection frame image being a frame image including the detected fixing mechanism.

A fixed state inspection system according to a second aspect of the present invention includes:

the aforementioned fixed state inspection apparatus; and an image capture means for capturing an image of the freight train, wherein the frame image group acquisition means acquires the frame image group information from the image capture means.

A fixed state inspection method according to a third aspect of the present invention includes:

acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;

detecting the fixing mechanism in an unfixed state different from the fixed state in the freight train, based on the frame image group information; and outputting detection position information relating to a position of the detected fixing mechanism in the freight train, based on a detection frame image being a frame image including the detected fixing mechanism.

A program according to a fourth aspect of the present invention causes a computer to function as:

a frame image group acquisition means for acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;

a detection means for detecting the fixing mechanism in an unfixed state different from the fixed state in the freight train, based on the frame image group information; and an output means for outputting detection position information relating to a position of the detected fixing mechanism in the freight train, based on a detection frame image being a frame image including the detected fixing mechanism.

The present invention enables safer operation of freight trains.

BRIEF DESCRIPTION OF THE DRAWINGS

FIG. 12 is a diagram illustrating an example of frame area information.

FIG. 17 is a diagram illustrating an example of frame-car information.

DESCRIPTION OF EMBODIMENTS

Example embodiments of the present invention will be described below by using drawings. Note that, in every drawing, similar components are given similar signs, and description thereof is omitted as appropriate.

Example Embodiment 1

Functional Configuration of Fixed State Inspection System 100

Figure 1:
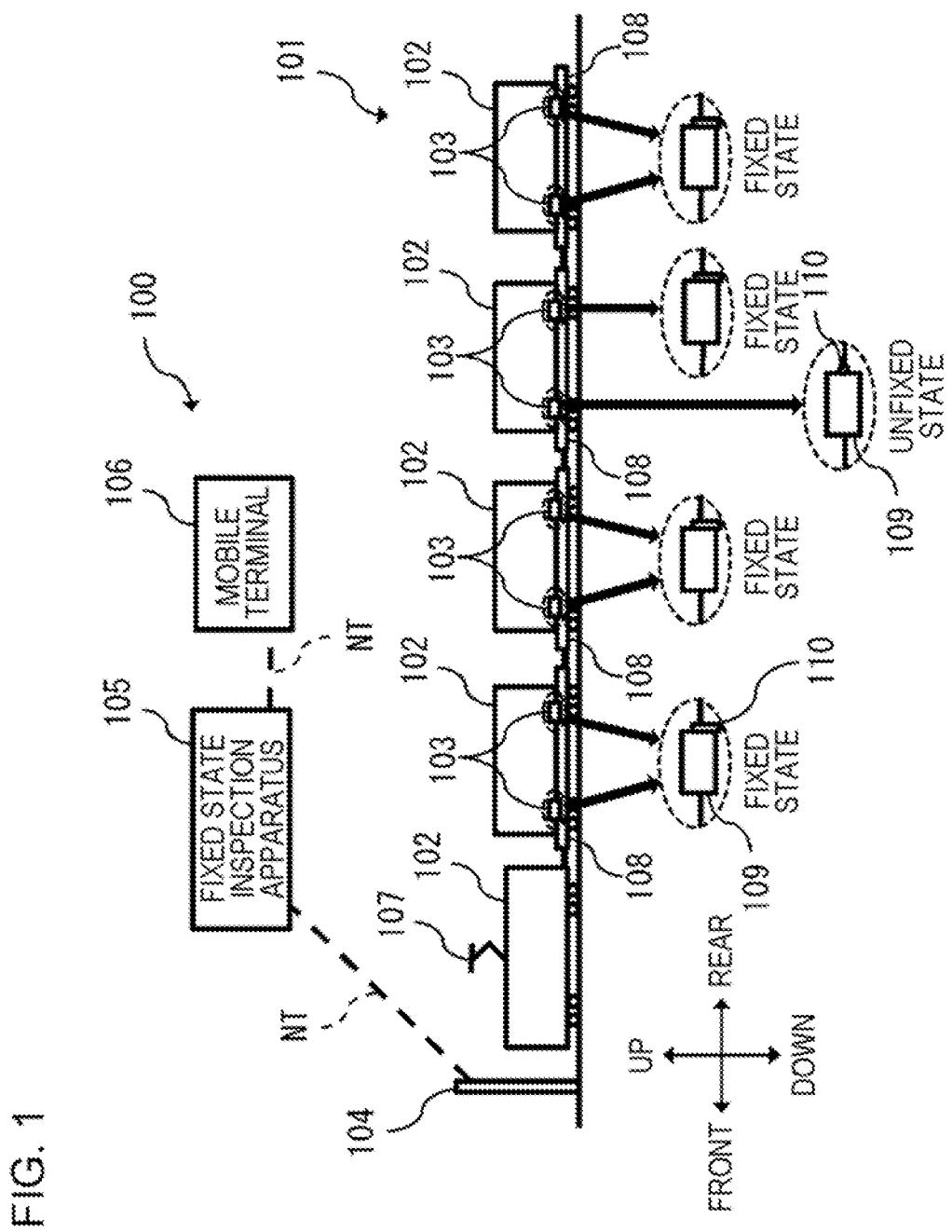
FIG. 1 is a diagram illustrating an overview of a configuration of a fixed state inspection system according to an example embodiment 1 of the present invention.

A fixed state inspection system 100 according to an example embodiment 1 of the present invention is a system for inspecting the state of a securing apparatus 103 provided at a container 102, based on a captured image of a freight train 101, as illustrated in FIG. 1. The fixed state inspection system 100 includes a camera 104, a fixed state inspection apparatus 105, and a mobile terminal 106 carried by a user such as an operator.

The camera 104 and the fixed state inspection apparatus 105, and the fixed state inspection apparatus 105 and the mobile terminal 106 are communicably connected through a network NT, respectively. Consequently, the components 104 and 105, and 105 and 106 can respectively exchange information through the network NT; however, information may be exchanged through a portable storage medium such as a flash memory instead of the network NT.

The freight train 101 being an inspection target has a five-car composition in the example embodiment, as illustrated in FIG. 1. The lead (first) car is a power car driving the freight train 101 by receiving power through a current collector 107. The second to fifth cars are cars connected through couplers in a sequential order from the power car and each car has a flatcar 108 on which the securing apparatus 103 is provided. One container 102 is loaded on each flatcar 108, and two securing apparatuses 103 are provided for each container 102, one at the front and the other at the rear, in association with the container 102.

Note that, such a composition of the freight train 101 is merely an example, and the number of coupled cars, the number of power cars, the number of containers 102 loaded on one flatcar 108, the number of securing apparatuses 103 associated with each container 102, and the like may be changed as appropriate. Further, the inspection target is not limited to the freight train 101 and may be a trailer to which a flatcar carrying one or a plurality of containers is coupled.

Each securing apparatus 103 is an apparatus for fixing a container 102 to a flatcar 108 and includes a body part 109 for fastening the container 102 to the flatcar 108, and a control lever 110. The control lever 110 is a round-bar part operated for switching between a fixed state and an unfixed state and, for example, is rotationally operated around a longitudinal axis.

The fixed state is a state in which a container 102 is fixed to a flatcar 108. Every securing apparatus 103 in the freight train 101 in operation is normally set to the fixed state. The control lever 110 in the fixed state is positioned to extend downward and roughly forms a long and narrow rectangle downward viewed from the right (in a direction from the front of the page in FIG. 1) as illustrated in securing apparatuses 103 other than one at the front of the fourth car in FIG. 1.

The following description assumes the traveling direction of the freight train 101 to be front and the opposite direction to be rear and defines up, down, left, and right, based on a direction viewing the freight train 101 from the front. Note that the terms indicating directions are used for description and are not intended to limit the present invention.

The unfixed state is a state different from the fixed state, that is, a state in which a container 102 is not fixed to a flatcar 108. The unfixed state includes a released state in which a container 102 can be attached to and detached from a flatcar 108 and a semifixed state not being the released state but being a state in which a container 102 is not fully fixed to a flatcar 108. The control lever 110 in the released state is positioned to extend rightward and roughly forms a small circle viewed from the right as illustrated in the securing apparatus 103 at the front of the fourth car in FIG. 1. Although not being illustrated, the control lever 110 in the semifixed state forms a rectangle with a length shorter than the fixed state in the vertical direction viewed from the right.

Note that while the example embodiment is described by an example of the round-bar control lever 110 rotationally operated around the longitudinal axis, the operation method of the control lever 110 is not limited to the above, and the shape or the like of the control lever 110 may also be changed as appropriate.

Further, while the example embodiment is described by an example of a fixed state and an unfixed state of a securing apparatus 103 being determined by the state of the control lever 110, the states has only to appear in an appearance of the securing apparatus 103 without being limited to the control lever 110.

Furthermore, the securing apparatus 103 is an example of a fixing mechanism being provided in association with a container 102 and being able to switch between a fixed state and a released state between members (for example, between a flatcar 108 and the bottom of a container 102). For example, a fixing mechanism may be a mechanism switching between a fixed state and a released state between a door provided in a visually recognizable manner from the outside of a container 102 and a body. In this case, the door may be fixed not to be openable in the fixed state and may be openable in the released state.

The camera 104 is an example of an image capture means for capturing an image of the freight train 101 and is installed at, for example, a car base where a container is loaded on and unloaded from a flatcar.

The camera 104 is fixed in such a way as to capture an image of the freight train 101 starting from the car base from the right side of the freight train 101.

When the freight train 101 travels forward, the camera 104 moves relatively to the freight train 101 along the traveling direction. The camera 104 continuously captures images of the freight train 101. Consequently, a plurality of frame images FR1 to FRn are acquired, and the camera 104 generates frame image group information including the plurality of frame images FR1 to FRn. Time intervals at which the camera 104 continuously captures FR1 to FRn may be determined as appropriate according to the operating velocity of the freight train 101 or the like.

Figure 2:
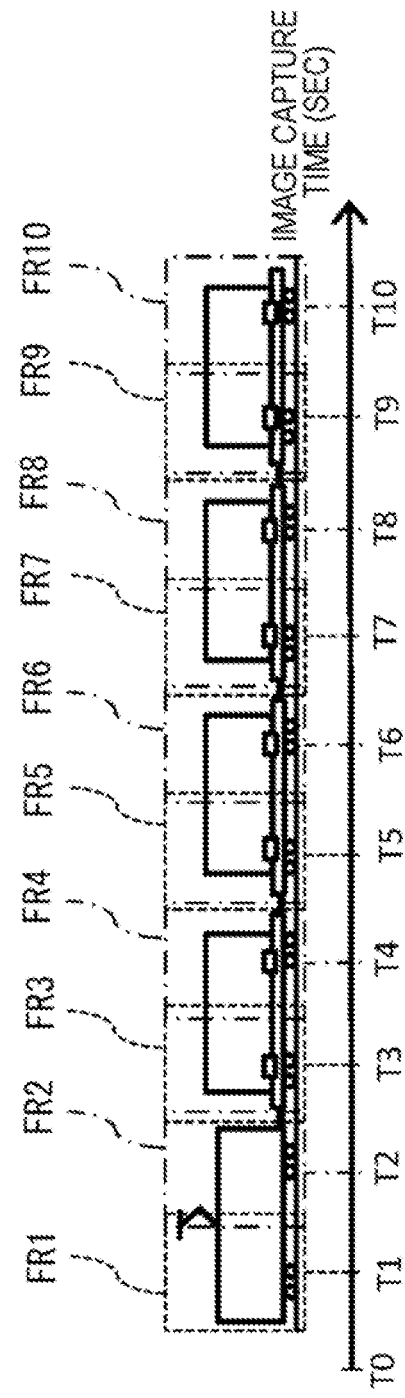
FIG. 2 is a diagram illustrating an example of a plurality of frame images.

The example embodiment will be described by an example of 10 frame images FR1 to FR10 being acquired and frame image group information including each of the frame images FR1 to FR10 being generated, as illustrated in FIG. 2. When detecting the head end of the freight train 101 by matching processing or the like, the camera 104 according to the present example embodiment starts image capture from the time T1. Then, the camera 104 continuously captures images at roughly constant intervals and when detecting the rear end of the freight train 101 by matching processing or the like, ends the image capture at the time T10, as illustrated in FIG. 2.

The frame images FR1 to FR10 are hereinafter simply denoted as "frame images FR" when the frame images are not particularly distinguished from one another.

As can be understood by referring to FIG. 2, a plurality of frame images FR partially overlap one another in the longitudinal direction and include the entire side part (the right side part in the present example embodiment) of the freight train 101 over the entire length along the longitudinal direction, according to the present example embodiment. Further, the plurality of frame images FR according to the present example embodiment include the entire side part of the freight train 101 in the vertical direction as well.

Note that an image capture range of the camera 104 in the vertical direction may not include the entire freight train 101 as long as the range is set to allow image capture of a securing apparatus 103. Further, there has only to be at least one frame image including a securing apparatus 103. Furthermore, the camera 104 may be placed in such a way as to be able to capture an image in which the state of a securing apparatus 103 provided in the freight train 101 appears, for example, on the left side, both left and right sides, or the like of the freight train 101 without being limited to the right side of the freight train 101.

The fixed state inspection apparatus 105 is an apparatus inspecting the state of the securing apparatus 103, based on frame image group information. When detecting a securing apparatus 103 in the unfixed state, the fixed state inspection apparatus 105 outputs detection position information allowing determination of the position of the securing apparatus 103.

Figure 3:
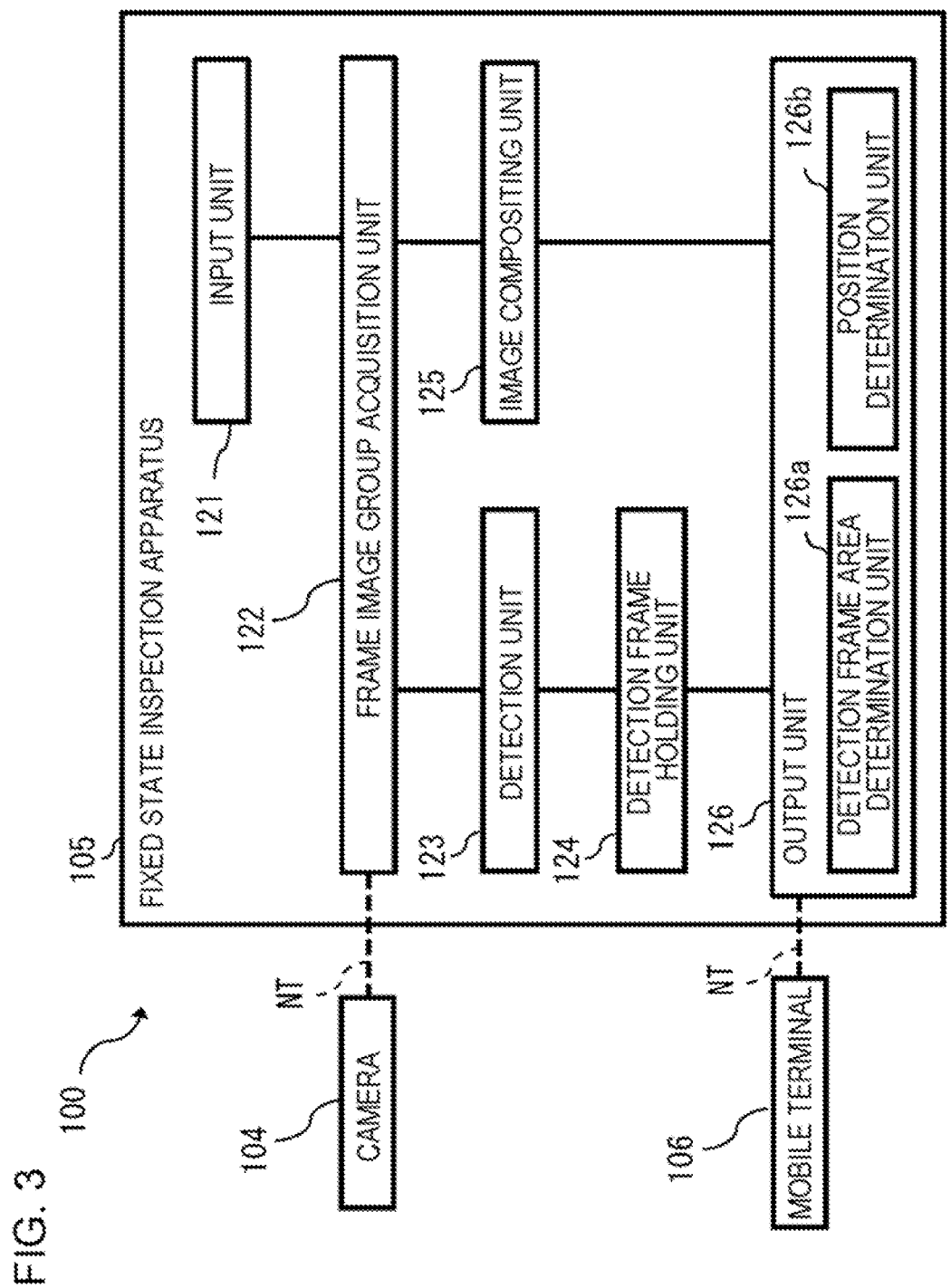
FIG. 3 is a diagram illustrating a functional configuration of the fixed state inspection system according to the example embodiment 1.

The fixed state inspection apparatus 105 functionally includes an input unit 121, a frame image group acquisition unit 122, a detection unit 123, a detection frame holding unit 124, an image compositing unit 125, and an output unit 126, as illustrated in FIG. 3.

The input unit 121 receives user inputs for various instructions, settings, and the like.

The frame image group acquisition unit 122 acquires frame image group information from the camera 104 and holds the information. Specifically, when acquiring frame image information indicating a frame image, the frame image group acquisition unit 122 may generate and hold frame image group information associating frame identification information for identifying the frame image with the frame image information. For example, frame identification information includes "FR1," "FR2," "FR3," . . . , and "FR10" being reference signs of the frame images in the description of the present example embodiment.

Note that when the end of the freight train 101 is not detected by the camera 104, a frame image not including the freight train 101 may be captured by the camera 104. In such a case, the frame image group acquisition unit 122 may extract and acquire a frame image including the freight train 101 from frame images included in frame image group information acquired from the camera 104. In the extraction, for example, the frame image group acquisition unit 122 may detect the front end and the tail end of the freight train 101 by feature value detection processing such as matching processing or edge detection. Then, for example, the frame image group acquisition unit 122 may extract and acquire a frame image captured between the detected head end and the detected tail end.

The detection unit 123 detects a securing apparatus 103 in the unfixed state in the freight train 101, based on frame image group information.

The detection unit 123 according to the present example embodiment detects a securing apparatus 103 in the unfixed state by using a learning model learned by machine learning. Specifically, the detection unit 123 detects a securing apparatus 103 in the unfixed state in the freight train 101 by inputting frame image group information to a learned learning model undergoing machine learning for detecting a securing apparatus 103 in the unfixed state.

Input data to a learning model during learning are image data including a securing apparatus 103 in each of the fixed state and the unfixed state. Images of a plurality of types of securing apparatuses may be employed in the input data. Then, supervised learning having the fixed state or the unfixed state as a correct answer depending on image data may be performed in the machine learning.

Furthermore, a learning model based on each of a plurality of image capture environments is prepared by learning, as input data, image data including an image of a securing apparatus 103 captured in each of the plurality of image capture environments, according to the present example embodiment. Specifically, the detection unit 123 detects a securing apparatus 103 in the unfixed state in the freight train 101 by inputting frame image group information and an image capture environment to a learned learning model undergoing machine learning for detecting a securing apparatus 103 in the unfixed state in a plurality of image capture environments.

For example, an image capture environment may be set based on at least one of a time period for image capture and the weather at image capture.

For example, when being determined based on a time period for image capture, an image capture environment may include "daytime" when it is light outside and "nighttime" when it is dark outside. In this case, a learned learning model may be prepared by machine learning with image data of a car an image of which is captured during each of the "daytime" and the "nighttime" as input data. For example, the "daytime" refers to 6 to 17 hours, and the "nighttime" refers to 0 to 6 hours and 17 to 24 hours.

Further, for example, when being determined based on the weather at image capture, an image capture environment may include "fine weather" when it is light outside and "cloudy weather/rainy weather" when it is relatively dark outside. Furthermore, for example, an image capture environment may be determined based on a combination of a time period for image capture and the weather at image capture. In such a case, a learned learning model may also be prepared by machine learning with image data of a car an image of which is captured in each image capture environment as input data.

When a securing apparatus 103 in the unfixed state is detected by the detection unit 123, the detection frame holding unit 124 holds frame identification information of a detection frame image. The detection frame image is a frame image including the securing apparatus 103 detected by the detection unit 123 (that is, the securing apparatus 103 in the unfixed state).

Figure 4:
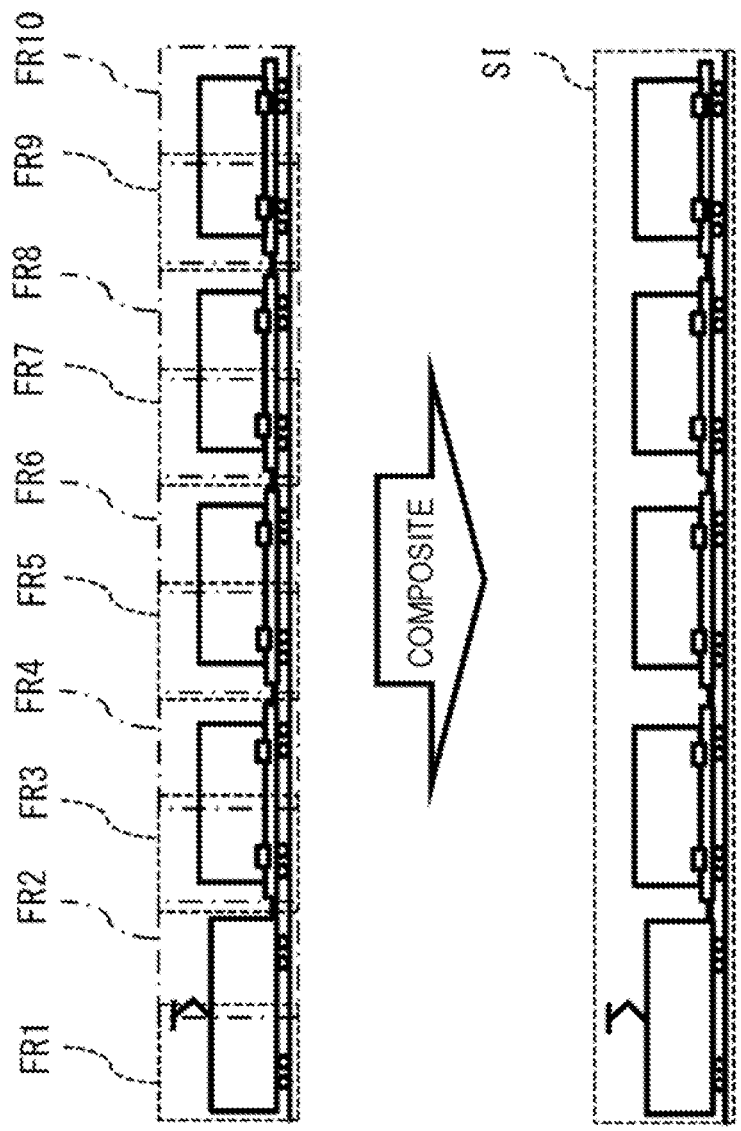
FIG. 4 is a diagram illustrating an example of an overall image acquired by compositing a plurality of frame images.

The image compositing unit 125 generates and holds overall image information indicating an overall image SI by compositing the plurality of frame images FR1 to FR10 included in the frame image group information. The overall image SI includes an image of a side part of the freight train 101 over the entire length along the traveling direction, as an example thereof is illustrated in FIG. 4. While the entire freight train 101 in the vertical direction is included in the overall image SI according to the present example embodiment, only part of the freight train 101 in the vertical direction may be included as long as the overall image SI includes a securing apparatus 103.

FIG. 3 is referred to again. The output unit 126 generates detection position information being information allowing determination of the position of a securing apparatus 103 in the unfixed state in the freight train 101, based on a detection frame image and other frame images and outputs the information to, for example, the mobile terminal 106 carried by an operator. For example, the detection position information indicates a car number, a car number and a position (at the front or at the rear of the car) of a securing apparatus 103, and a car number and a position number (in a sequence of securing apparatuses 103 in the car) of a securing apparatus 103.

Specifically, the output unit 126 includes a detection frame area determination unit 126a and a position determination unit 126b.

The detection frame area determination unit 126a determines an area occupied by a detection frame image in an overall image SI, based on the detection frame image and the overall image SI. The detection frame area determination unit 126a according to the present example embodiment determines an area ARD occupied by a detection frame image in the overall image SI by checking the detection frame image against the overall image SI.

The position determination unit 126b determines the car number of a car relating to an area ARD determined by the detection frame area determination unit 126a, by analyzing an overall image SI, and generates and outputs information indicating the car number as detection position information. The "car number" here indicates a car number counted from a predetermined car (the lead car in the present example embodiment) in a predetermined direction (toward the rear in the present example embodiment).

Physical Configuration of Fixed State Inspection System 100

Figure 5:
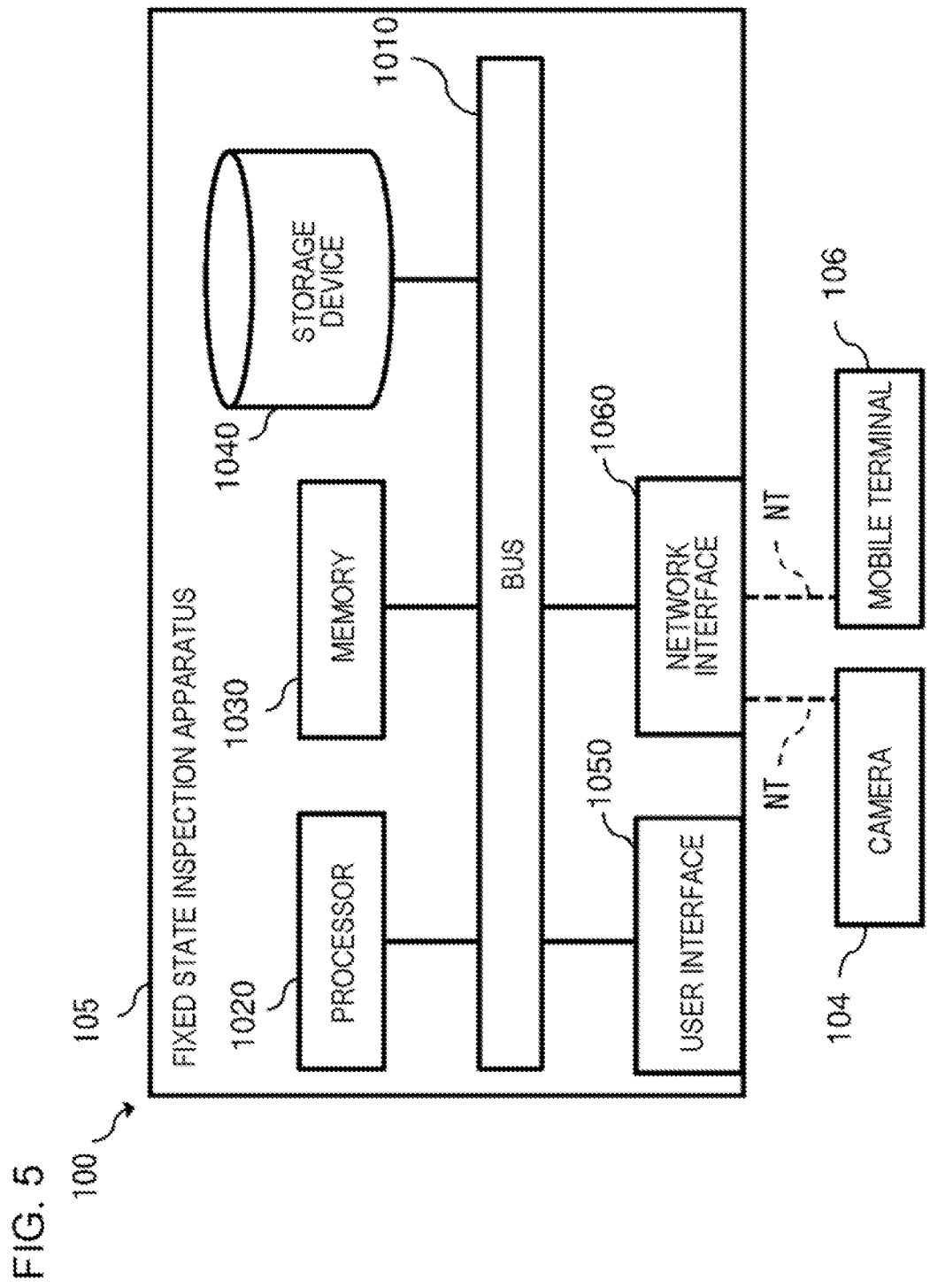
FIG. 5 is a diagram illustrating a physical configuration example of a fixed state inspection apparatus according to the example embodiment 1.

FIG. 5 is a diagram illustrating a physical configuration example of the fixed state inspection system 100.

Examples of the camera 104 include a line scan camera and an area sensor camera. Examples of the mobile terminal 106 include a tablet personal computer (PC) and a smartphone. The network NT connecting the camera 104 to the fixed state inspection apparatus 105, and the fixed state inspection apparatus 105 to the mobile terminal 106, respectively, has a wireless or wired configuration, or a combination of the two.

For example, the fixed state inspection apparatus 105 is provided by a general-purpose personal computer and includes a bus 1110, a processor 1120, a memory 1130, a storage device 1140, a user interface 1150, and a network interface 1160.

The bus 1110 is a data transmission channel for the processor 1120, the memory 1130, the storage device 1140, the user interface 1150, and the network interface 1160 to transmit and receive data to and from one another. Note that the method of interconnecting the processor 1120 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules for providing functional units (the input unit 121, the frame image group acquisition unit 122, the detection unit 123, the detection frame holding unit 124, the image compositing unit 125, and the output unit 126) in the fixed state inspection apparatus 105. By the processor 1020 reading each program module into the memory 1030 and executing the program module, each functional unit relating to the program module is provided. Further, the storage device 1140 also provides a function for holding information in the frame image group acquisition unit 122, the detection frame holding unit 124, the image compositing unit 125, and the like.

Examples of the user interface 1050 include a touch panel, a keyboard, and a mouse as interfaces for a user to input information, and a liquid crystal panel as an interface for providing information for a user.

The network interface 1060 is an interface for connecting the fixed state inspection apparatus 105 to the network NT.

Fixed State Inspection Method

Figure 6:
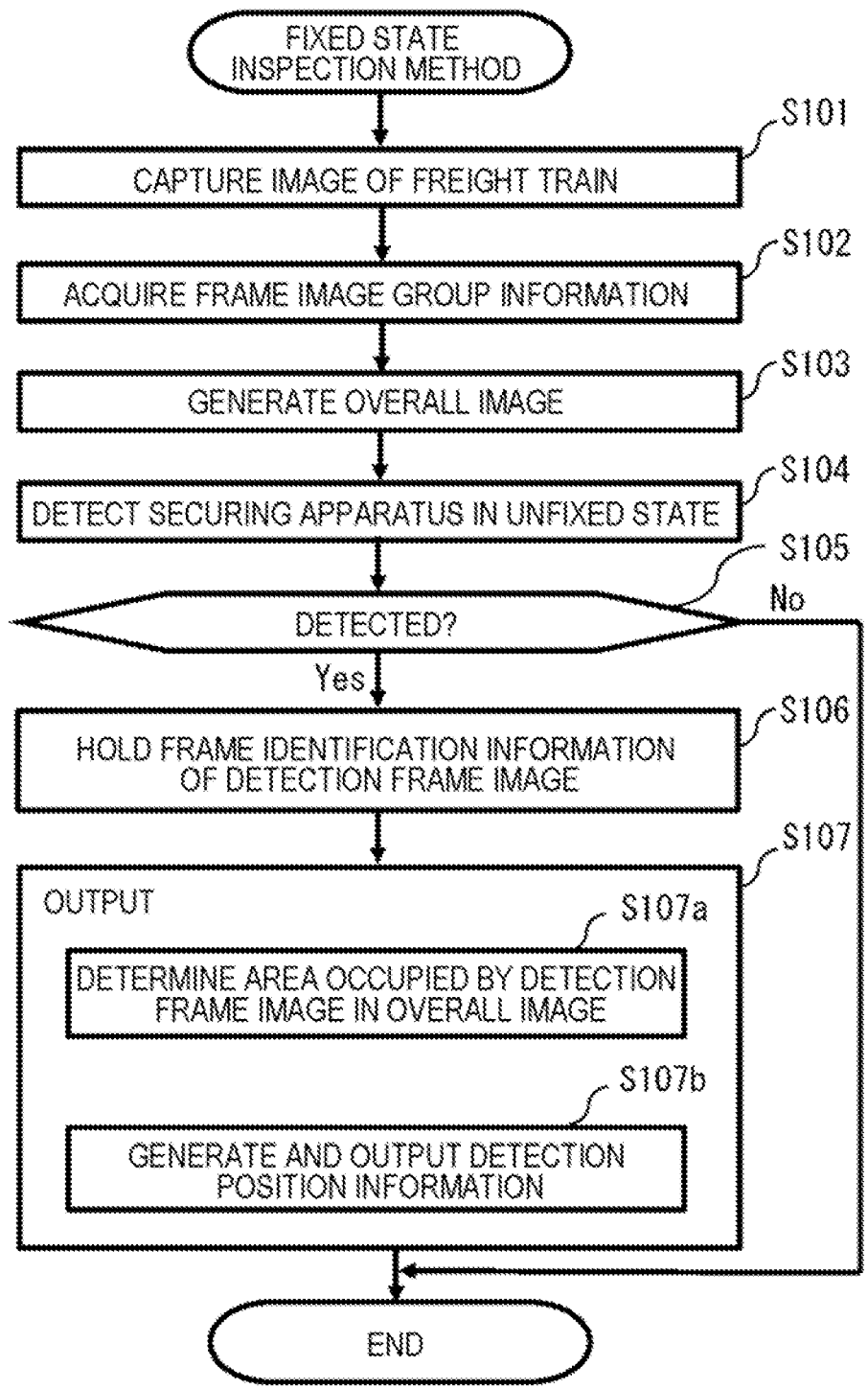
FIG. 6 is a flowchart of a fixed state inspection method according to the example embodiment 1 of the present invention.

A fixed state inspection method according to the example embodiment 1 of the present invention will be described with reference to FIG. 6. The fixed state inspection method is a method for inspecting the state of a securing apparatus 103 provided at the container 102, based on a captured image of the freight train 101.

For example, the fixed state inspection method is started when the input unit 121 receives an input of an image capture environment (an image capture time or the weather at image capture) at image capture and receives a start instruction of the fixed state inspection method. For example, the freight train 101 may stand by at the rear of the camera 104 until a start instruction is input and may start traveling with input of a start instruction.

The camera 104 captures an image of the freight train 101 (Step S101).

Specifically, the freight train 101 travels at a predetermined velocity, stops temporarily when the rear end thereof passes the side of the camera 104, and awaits the end of the fixed state inspection method. By the camera 104 capturing images of the freight train 101 while the freight train 101 thus travels, frame image group information including the plurality of frame images FR1 to FR10 as illustrated in FIG. 2 is generated.

Note that the camera 104 has only to be able to capture images including the entire freight train 101 from the front end to the rear end in the longitudinal direction, and the camera 104 may move along the traveling direction of the freight train 101 along a guide or the like installed as appropriate.

The frame image group acquisition unit 122 acquires frame image group information from the camera 104 (Step S102).

At this time, when acquiring frame image information, the frame image group acquisition unit 122 successively generates information associating frame identification information with the acquired frame image information and holds the generated information as frame image group information.

The image compositing unit 125 generates an overall image SI by compositing the plurality of frame images FR1 to FR10 included in the frame image group information acquired in Step S102 (Step S103). Then, the image compositing unit 125 holds overall image information indicating the overall image SI.

The detection unit 123 detects a securing apparatus 103 in the unfixed state in the freight train 101, based on the frame image group information (Step S104).

Specifically, the detection unit 123 detects a securing apparatus 103 in the unfixed state by inputting each of the frame images FR1 to FR10 included in the frame image group information to a learning model.

A model based on the image capture environment received before the start of the fixed state inspection method is selected as the learning model employed at this time. Consequently, precision of detecting a securing apparatus 103 in the unfixed state can be further improved.

For example, it is assumed as illustrated in FIG. 1 that, out of securing apparatuses 103 provided in the freight train 101, the securing apparatus 103 provided at the front of the fourth car is in the unfixed state, and the other securing apparatuses 103 are in the fixed state.

In this case, the detection unit 123 detects a securing apparatus 103 in the unfixed state when frame image information indicating the frame image FR7 is input to the learning model. Further, the detection unit 123 does not detect a securing apparatus 103 in the unfixed state when frame image information indicating each of the other frame images FR1 to 6 and 8 to 10 is input to the learning model.

The detection frame holding unit 124 determines whether a securing apparatus 103 in the unfixed state is detected in Step S104 (Step S105).

When determining that a securing apparatus 103 in the unfixed state is not detected (Step S105: No), the detection frame holding unit 124 ends the fixed state inspection method. Note that, in this case, the output unit 126 may output information indicating the end of the fixed state inspection method to, for example, the mobile terminal 106.

When determining that a securing apparatus 103 in the unfixed state is detected (Step S105: Yes), the detection frame holding unit 124 holds frame identification information of the detection frame image (Step S106).

The detection frame image in this case is a frame image including the securing apparatus 103 in the unfixed state detected in Step S104. Further, the frame identification information of the detection frame image is frame identification information associated with the detection frame image in Step S102.

For example, when the detection frame image is the frame image FR7, the detection frame holding unit 124 holds frame identification information of the frame image FR7, that is, frame identification information indicating "FR7."

Note that, as described above, the overall image SI generated in Step S103 is not used in Steps S104 to S106. Therefore, the processing in Step S103 may be executed at some point while the processing in Steps S104 to S106 is performed and may be performed in parallel with the processing in Steps S104 to S106.

The output unit 126 generates detection position information being information allowing determination of the position of the securing apparatus 103 in the unfixed state in the freight train 101, the apparatus being detected in Step S104, and outputs the information to the mobile terminal 106 (Step S107).

Specifically, in the output processing (Step S107), the detection frame area determination unit 126*a* determines an area ARD occupied by the detection frame image in the overall image SI by checking the detection frame image against the overall image SI (Step S107*a*).

Figure 7:
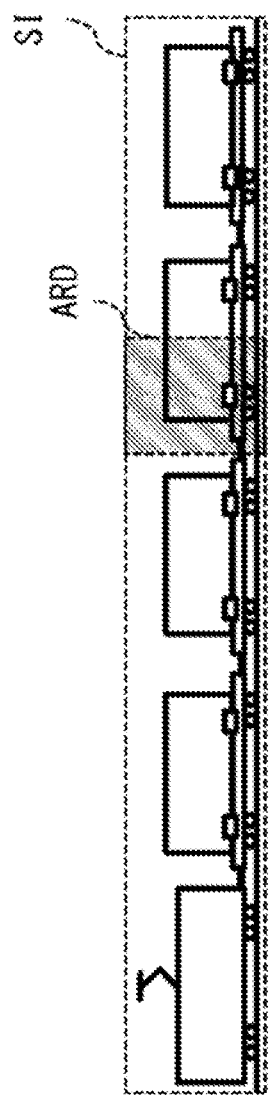
FIG. 7 is a diagram illustrating an example of an area ARD occupied by a detection frame image in an overall image.

For example, when the detection frame image is the frame image FR7, the detection frame area determination unit 126*a* determines a hatched area ARD in FIG. 7. For example, a degree of matching of keypoints included in the frame image FR7 or a degree of similarity of pixel values may be used for the determination.

The position determination unit 126*b* generates detection position information relating to the area ARD determined in Step S107*a* and outputs the information to the mobile terminal 106 (Step S107*b*).

Specifically, by analyzing the overall image SI, the position determination unit 126*b* detects ends of the cars in a sequential order from the front and determines the car number of a car included in the area ARD.

Figure 8:
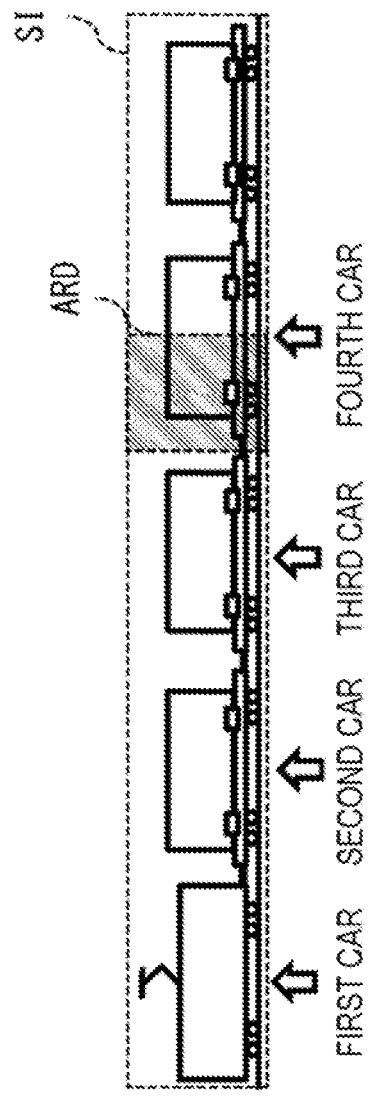
FIG. 8 is a diagram illustrating an example of a car number of a car being determined by determining car numbers of cars indicated in an overall image SI in a sequential order from the front, the car being indicated by an area ARD occupied by a detection frame image in the overall image.

For example, when the fourth car is determined as illustrated in FIG. 8 in a case of the hatched area ARD in FIG. 7 being determined, the area ARD is included in the car. Therefore, the position determination unit 126*b* generates detection position information indicating "the fourth" as a car number and outputs the information to the mobile terminal 106.

Note that the area ARD may be determined to be at the front of the fourth car by analyzing the overall image SI in more detail, and detection position information indicating "the front of the fourth" may be generated and may be output to the mobile terminal 106. Further, when a plurality of securing apparatuses 103 in the unfixed state are detected, detection position information allowing determination of all positions of the securing apparatuses 103 in the unfixed state may be determined and output.

Thus, the position determination unit 126*b* ends the fixed state inspection method.

When the mobile terminal 106 does not receive detection position information even after the fixed state inspection method is ended, a user can learn that every securing apparatus 103 in the freight train 101 is in the fixed state.

When the mobile terminal 106 receives detection position information, a user can determine the position of a securing apparatus 103 in the unfixed state, based on the detection position information. In other words, the user can readily recognize the position of the securing apparatus 103 in the unfixed state.

Then, by checking the state of a securing apparatus 103 in a car indicated by the detection position information and operating the control lever 110 of the securing apparatus 103, the user can set every securing apparatus 103 provided in the freight train 101 to the fixed state.

For example, when detection position information indicates the fourth, a user may check two securing apparatuses 103 provided in the fourth car. When confirming that one provided at the front out of the two securing apparatuses 103 is in the unfixed state, the user may operate the control lever 110 and set the securing apparatus 103 to the fixed state.

Thus, a securing apparatus 103 in the unfixed state can be automatically detected out of the securing apparatuses 103 provided in the freight train 101, and a user can readily recognize the securing apparatus 103. Then, the user can operate the securing apparatus 103 in the unfixed state and set the securing apparatus 103 to the fixed state. Accordingly, safer operation of freight trains can be achieved.

The example embodiment 1 of the present invention has been described above. As described above, the present example embodiment enables safer operation of freight trains.

According to the present example embodiment, a securing apparatus 103 in the unfixed state is detected by using a learning model learned by machine learning. Consequently, a securing apparatus 103 in the unfixed state can be more precisely detected out of the securing apparatuses 103 provided in the freight train 101. Accordingly, yet safer operation of freight trains can be achieved.

Further, a securing apparatus 103 in the unfixed state is detected by using a learning model based on a plurality of image capture environments. Consequently, a securing apparatus 103 in the unfixed state can be more precisely detected out of the securing apparatuses 103 provided in the freight train 101. Accordingly, yet safer operation of freight trains can be achieved.

Example Embodiment 2

Functional Configuration of Fixed State Inspection System 200

Figure 9:
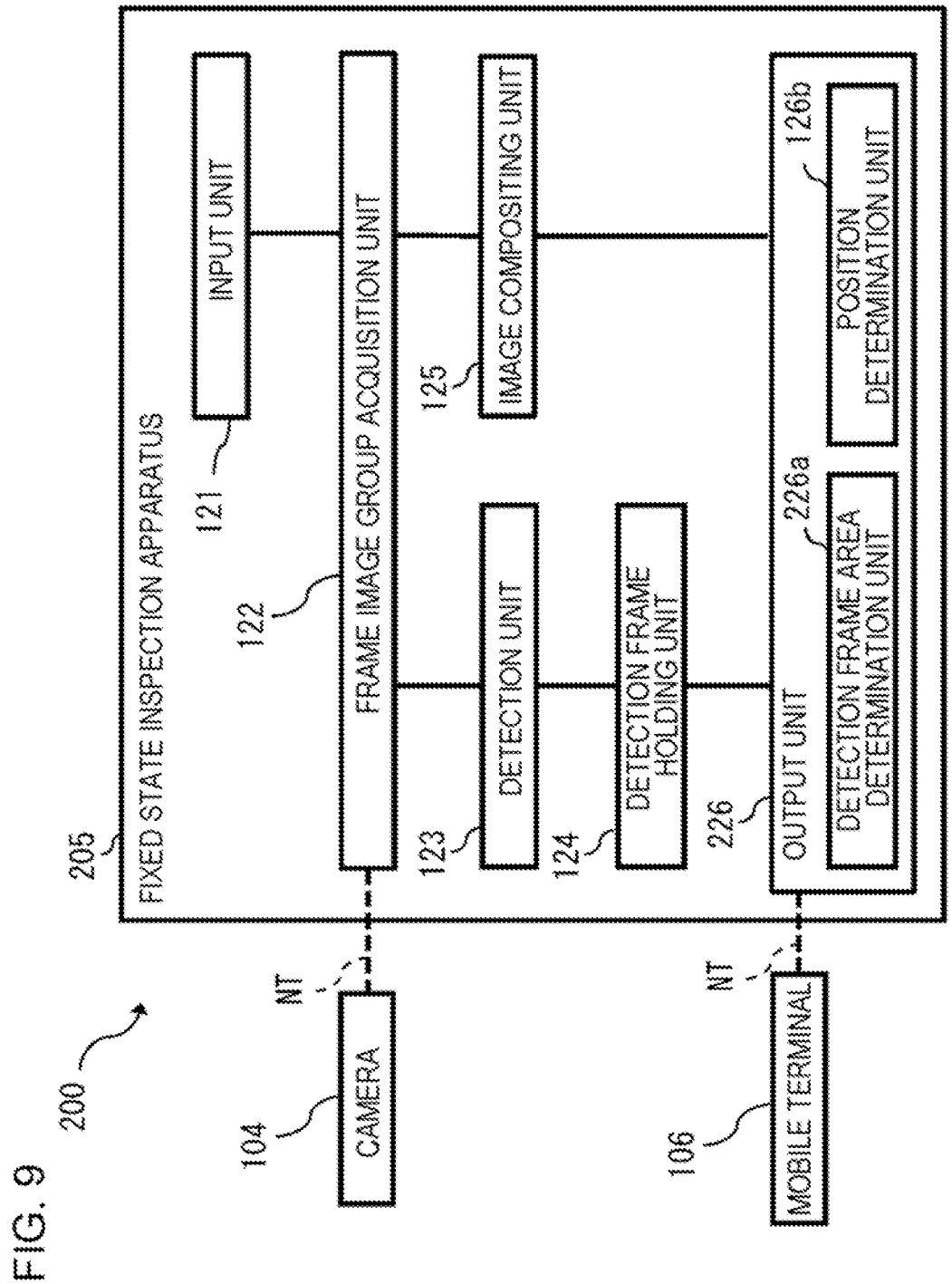
FIG. 9 is a diagram illustrating a functional configuration of a fixed state inspection system according to an example embodiment 2 of the present invention.

In a fixed state inspection system 200 according to an example embodiment 2 of the present invention, a fixed state inspection apparatus 205 includes an output unit 226 in place of the output unit 126 according to the example embodiment 1, as illustrated in FIG. 9. Except for the above, the fixed state inspection system 200 is configured similarly to the fixed state inspection system 100 according to the example embodiment 1.

The output unit 226 includes a detection frame area determination unit 226*a* in place of the detection frame area determination unit 126*a* according to the example embodiment 1. Except for the above, the output unit 226 is configured similarly to the output unit 126 according to the example embodiment 1.

The detection frame area determination unit 226*a* determines an area ARD occupied by a detection frame image in an overall image SI, based on the detection frame image and the overall image SI, similarly to the detection frame area determination unit 126*a* according to the example embodiment 1.

The detection frame area determination unit 226*a* according to the present example embodiment determines an area ARD occupied by a detection frame image in an overall image SI, based on frame area information. The frame area information is information indicating an area occupied by each frame image FR in the overall image SI.

Figure 10:
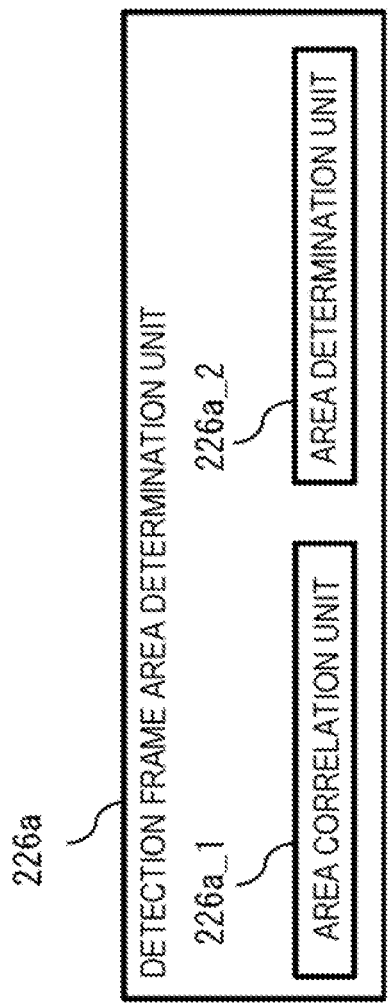
FIG. 10 is a diagram illustrating a configuration of a detection frame area determination unit according to the example embodiment 2.

Specifically, the detection frame area determination unit 226a includes an area correlation unit 226a_1 and an area determination unit 226a_2, as illustrated in FIG. 10. The area correlation unit 226a_1 generates frame area information, based on each of a plurality of frame images FR and the overall image SI. The area determination unit 226a_2 determines an area ARD occupied by a detection frame image in the overall image SI, based on frame area information.

Physical Configuration of Fixed State Inspection System 200

The fixed state inspection system 200 may be physically configured similarly to the fixed state inspection system 100 according to the example embodiment 1 (see FIG. 5).

Fixed State Inspection Method

Figure 11:
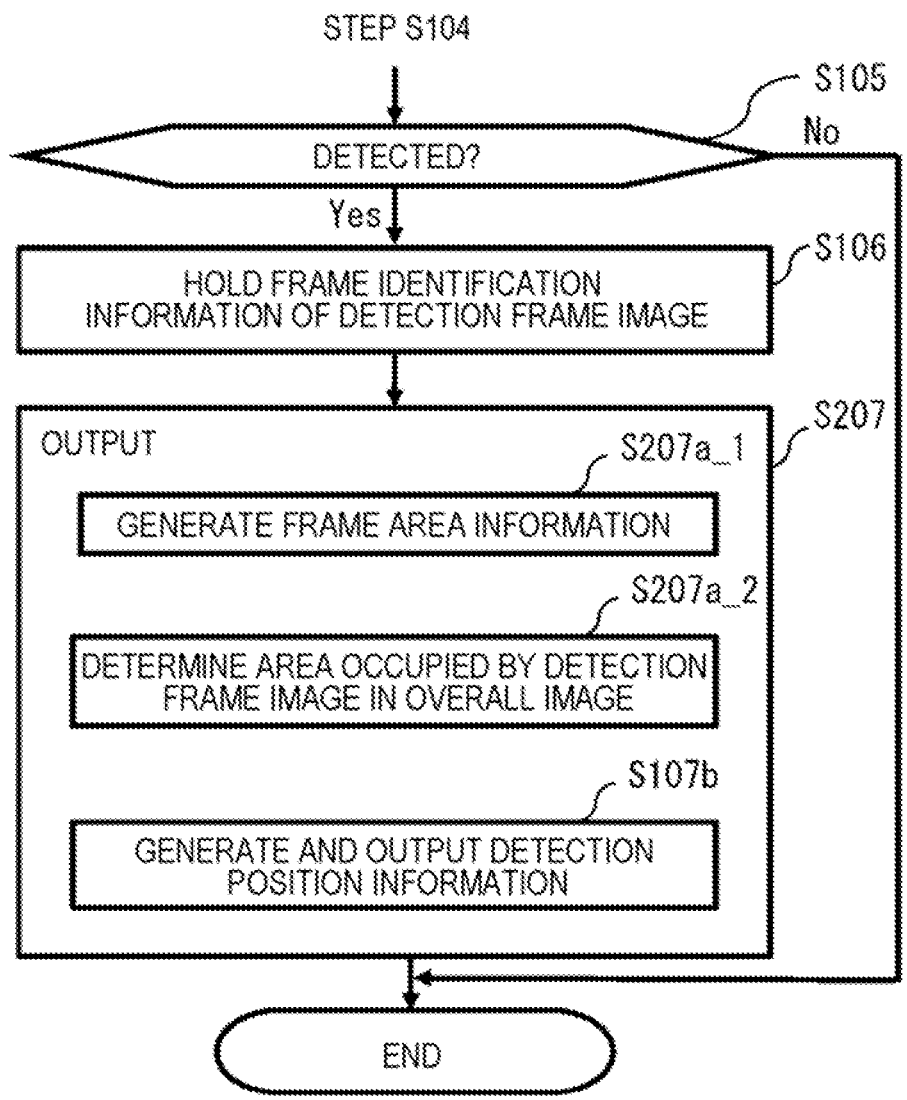
FIG. 11 is a flowchart of a fixed state inspection method according to the example embodiment 2 of the present invention.

A fixed state inspection method according to the example embodiment 2 of the present invention will be described with reference to FIG. 11. As illustrated in the diagram, the fixed state inspection method according to the present example embodiment includes output processing (S207) in place of the output processing (S107) in the fixed state inspection method according to the example embodiment 1.

The output processing (S207) includes Step S207a_1 and S207a_2 that are characteristic of the present example embodiment and detection position information generation-output processing (Step S107b) similar to that according to the example embodiment 1.

In frame area information generation processing (Step S207a_1), the area correlation unit 226a_1 generates frame area information by determining an area occupied by each of a plurality of frame images FR in the overall image SI.

FIG. 12 is a diagram illustrating an example of frame area information.

In frame area information, frame identification information is associated with information indicating an area occupied by a frame image FR in the overall image SI, the frame image being determined by the frame identification information.

In the example illustrated in FIG. 12, an area is represented by positions of four vertices of a rectangle. For example, the position is a pixel position in a coordinate system with the lower left corner of the overall image SI as the origin, the longitudinal direction of the freight train 101 in the image SI as the X-axis, and the vertical direction as the Y-axis.

In detection frame area information generation processing (Step S207a_2), the area determination unit 226a_2 determines an area ARD occupied by a detection frame image in the overall image SI by referring to the frame area information.

Specifically, the area determination unit 226a_2 determines an area associated with frame identification information of the detection frame image in the frame area information to be an area ARD occupied by the detection frame image in the overall image SI.

After generating detection position information relating to the area ARD determined in Step S207a_2 and outputting the information to a mobile terminal 106 (Step S107b), the position determination unit 126b ends the fixed state inspection method.

The example embodiment 2 of the present invention has been described above. The present example embodiment also enables safer operation of freight trains, similarly to the example embodiment 1.

Example Embodiment 3

Functional Configuration of Fixed State Inspection System 300

Figure 13:
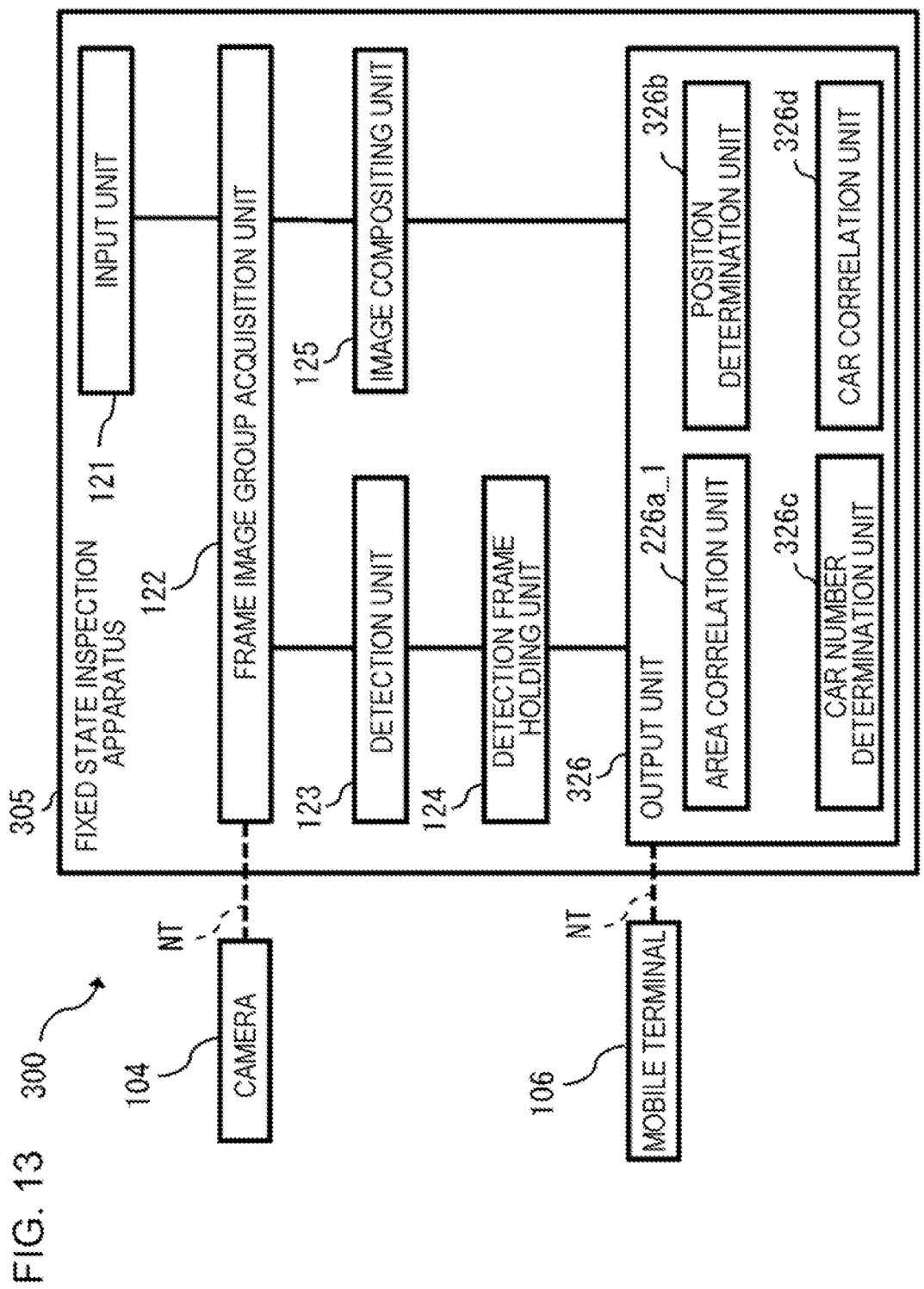
FIG. 13 is a diagram illustrating a functional configuration of a fixed state inspection system according to an example embodiment 3 of the present invention.

In a fixed state inspection system 300 according to an example embodiment 3 of the present invention, a fixed state inspection apparatus 305 includes an output unit 326 in place of the output unit 126 according to the example embodiment 1, as illustrated in FIG. 13. Except for the above, the fixed state inspection system 300 is configured similarly to the fixed state inspection system 100 according to the example embodiment 1.

The output unit 326 according to the present example embodiment includes an area correlation unit 226a_1 similar to that according to the example embodiment 2, and a car number determination unit 326c, a car correlation unit 326d, and a position determination unit 326b that are characteristic of the present example embodiment.

The car number determination unit 326c determines a car number of each car in an overall image SI by analyzing the overall image SI.

The car correlation unit 326d generates frame-car information, based on frame area information and a car number determined by the car number determination unit 326c. The frame-car information is information indicating the car number of a car indicated in each frame image FR.

The position determination unit 326b generates detection position information indicating the car number of a car indicated in a detection frame image, based on frame-car information and outputs the generated information to, for example, a mobile terminal 106.

Physical Configuration of Fixed State Inspection System 300

The fixed state inspection system 300 may be physically configured similarly to the fixed state inspection system 100 according to the example embodiment 1 (see FIG. 5).

Fixed State Inspection Method

Figure 14:
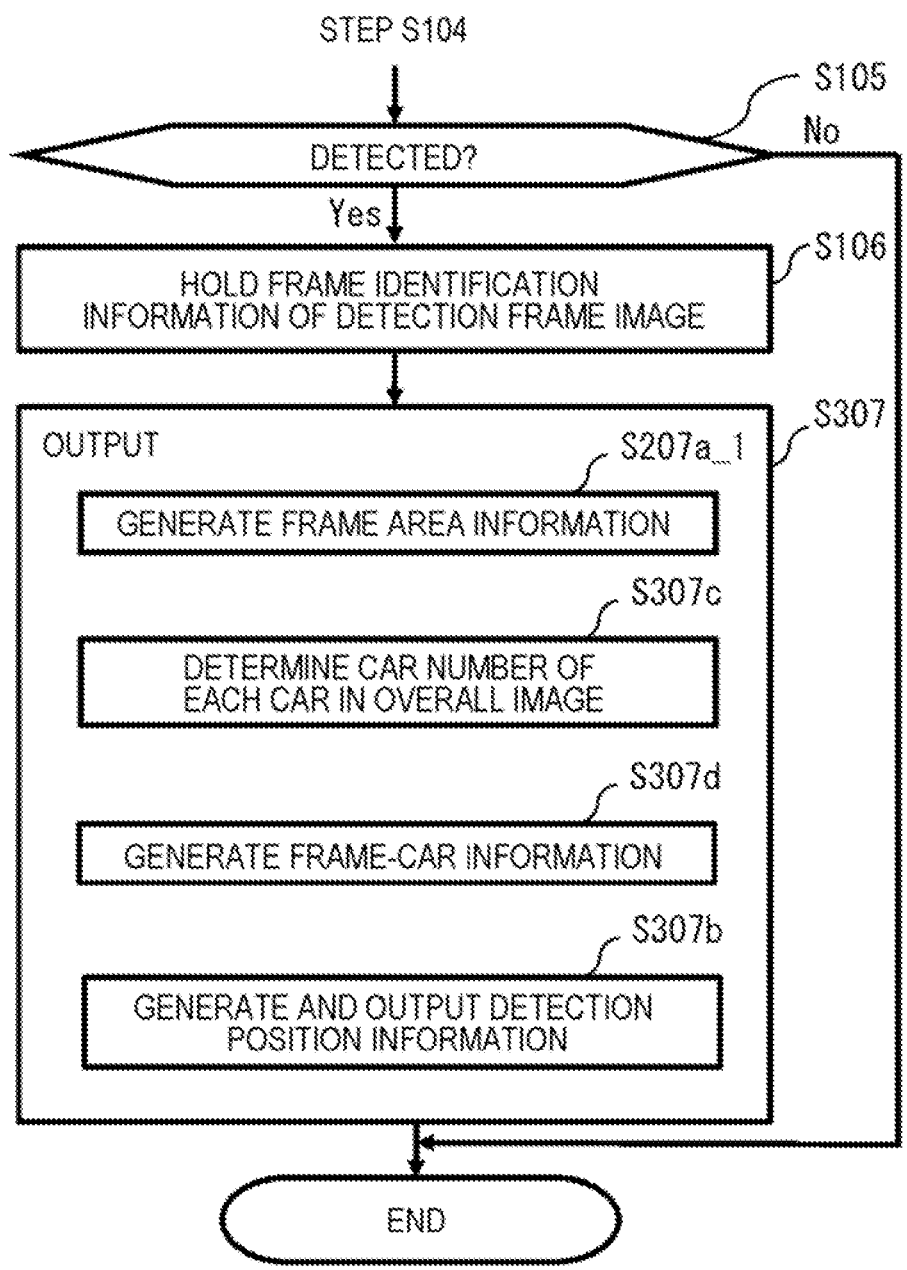
FIG. 14 is a flowchart of a fixed state inspection method according to the example embodiment 3 of the present invention.

A fixed state inspection method according to the example embodiment 3 of the present invention will be described with reference to FIG. 14. As illustrated in the diagram, the fixed state inspection method according to the present example embodiment includes output processing (Step S307) in place of the output processing (Step S107) in the fixed state inspection method according to the example embodiment 1. Except for the above, the fixed state inspection method according to the present example embodiment may be configured similarly to the fixed state inspection method according to the example embodiment 1.

The output processing (Step S307) includes frame area information generation processing (Step S207a_1) similar to that according to the example embodiment 2, and Steps S307c, S307d, and S307b that are characteristic of the present example embodiment.

Figure 15:
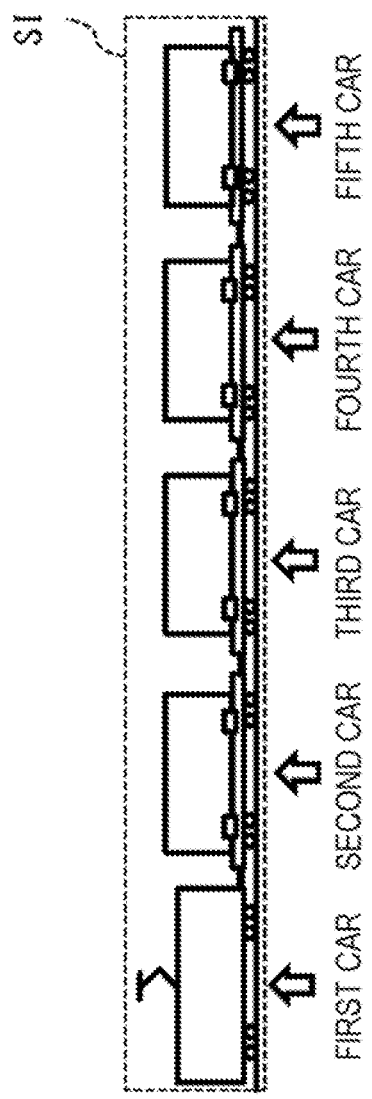
FIG. 15 is a diagram illustrating an example of a car number of each car in an overall image SI being determined.

In car number determination processing (Step S307c), the car number determination unit 326c determines a car number of each car in the overall image SI, for example, as illustrated in FIG. 15, by analyzing the overall image SI.

In frame-car information generation processing (Step S307d), the car correlation unit 326d generates frame-car information, based on frame area information and the car number determined in Step S307c.

Specifically, the car correlation unit 326d determines which of the car numbers determined in Step S307c relates to an area associated with each piece of car identification information in the frame area information. The car correlation unit 326d generates frame-car information by associating car identification information with a car number determined for the car identification information and holds the generated information.

Figure 16:
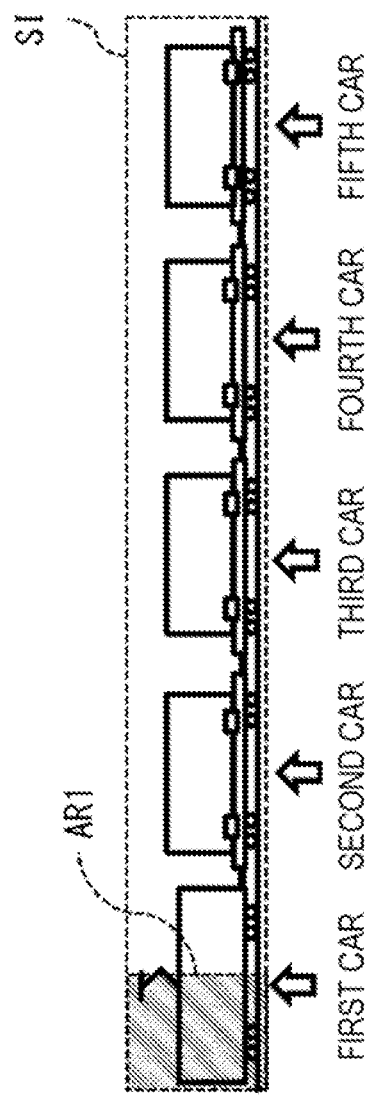
FIG. 16 is a diagram illustrating an example of an area AR1 occupied by a frame image FR1 in the overall image SI.

For example, it is assumed that frame identification information of the frame image FR1 being "FR1" is a processing target. The car correlation unit 326d determines an area AR1 occupied by the frame image FR1 in the overall image SI by referring to frame area information. The area AR1 determined here is a hatched area in FIG. 16.

The car correlation unit 326d determines which of the car numbers determined in Step S307c relates to the determined area AR1. As can be understood by referring to FIG. 16, the car correlation unit 326d determines that the area AR1 relates to the first car.

The car correlation unit 326d generates frame-car information associating frame identification information "FR1" being a processing target with "the first" being a car number determined for the frame identification information.

Similar processing is performed on each piece of frame identification information "FR2" to "FR10" as a processing target. Consequently, for example, frame-car information as illustrated in FIG. 17 is generated.

In detection position information generation processing (Step S307b), the position determination unit 326b generates detection position information indicating a car number, based on the frame identification information of the detection frame image and the frame-car information, and outputs the generated information to, for example, the mobile terminal 106.

Specifically, the position determination unit 326b acquires the frame identification information held in Step S106 from the detection frame holding unit 124. The position determination unit 326b determines a car number associated with the acquired frame identification information in the frame-car information generated in Step S307d. The position determination unit 326b generates and outputs detection position information indicating the determined car number.

Thus, the position determination unit 326b ends the fixed state inspection method.

The example embodiment 3 of the present invention has been described above. The present example embodiment also enables safer operation of freight trains, similarly to the example embodiment 1.

Example Embodiment 4

An example of individually inputting frame images to a learning model when detecting a securing apparatus 103 in the unfixed state has been described in the example embodiments 1 to 3. However, a securing apparatus 103 in the unfixed state may be detected by inputting an overall image SI acquired from frame image group information to a learning model. In example embodiments 4 to 6, examples of detecting a securing apparatus 103 in the unfixed state, based on an overall image SI will be described.

Functional Configuration of Fixed State Inspection System 400

Figure 18:
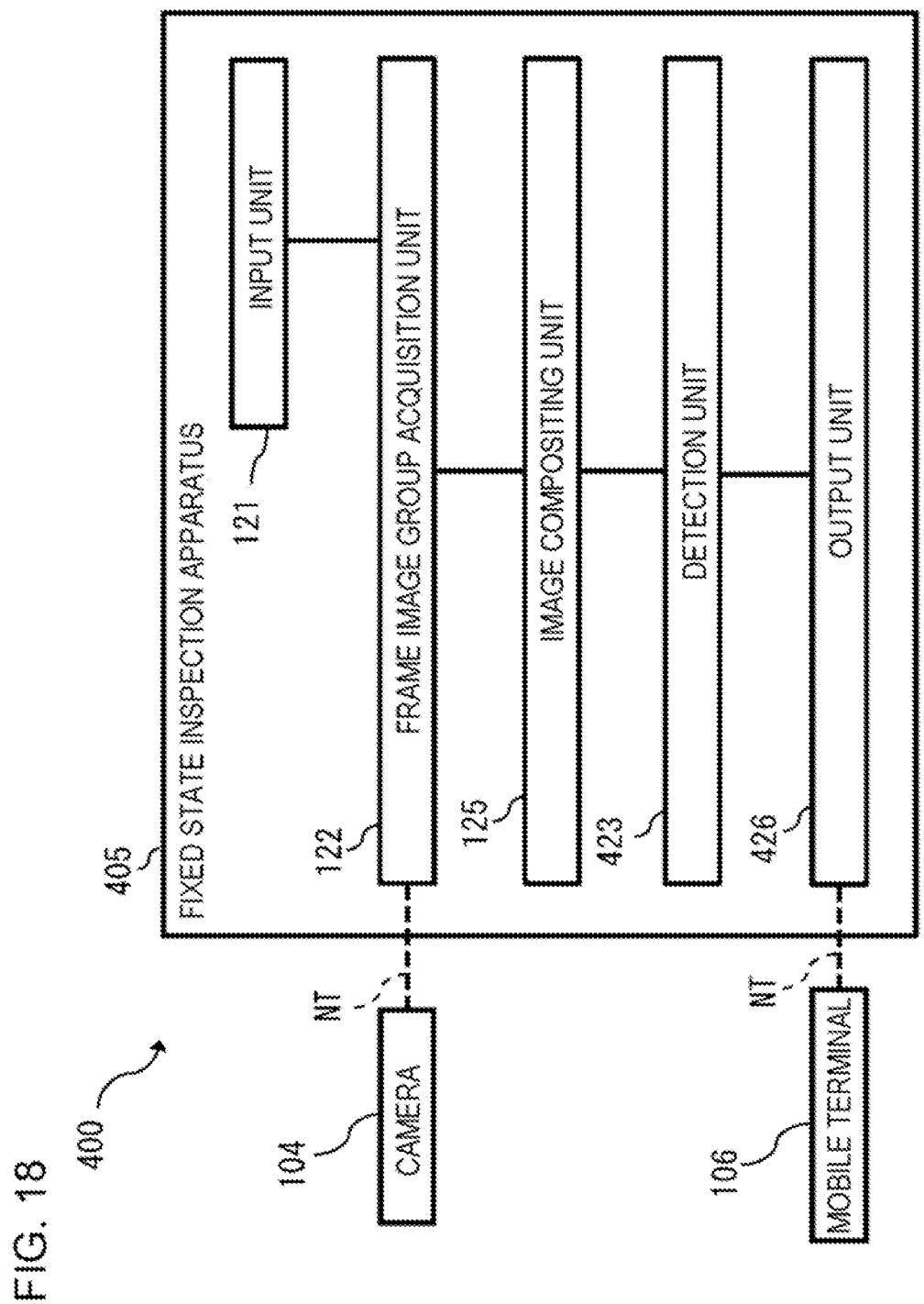
FIG. 18 is a diagram illustrating a functional configuration of a fixed state inspection system according to an example embodiment 4 of the present invention.

A fixed state inspection system 400 according to the example embodiment 4 of the present invention includes a camera 104 and a mobile terminal 106 that are similar to those according to the example embodiment 1, and a fixed state inspection apparatus 405 in place of the fixed state inspection apparatus 105 according to the example embodiment 1, as illustrated in FIG. 18.

The fixed state inspection apparatus 405 includes an input unit 121, a frame image group acquisition unit 122, and an image compositing unit 125 that are similar to those according to the example embodiment 1, and a detection unit 423 and an output unit 426 that are characteristic of the present example embodiment.

The detection unit 423 detects a securing apparatus 103 in the unfixed state in the freight train 101, based on frame image group information, similarly to the example embodiment 1. The detection unit 423 detects a securing apparatus 103 in the unfixed state in the freight train 101, based on an overall image SI acquired from the frame image group information.

In other words, the detection unit 423 detects a securing apparatus 103 in the unfixed state, based on the overall image SI. In this respect, the detection unit 423 differs from the detection unit 123 detecting a securing apparatus 103 in the unfixed state, based on each frame image FR included in frame image group information.

Specifically, the detection unit 423 detects a securing apparatus 103 in the unfixed state in the freight train 101 by inputting information indicating the overall image SI to a learned learning model undergoing machine learning for detecting a securing apparatus 103 in the unfixed state.

The output unit 426 generates detection position information, based on a detection frame image and other frame images and outputs the information to, for example, the mobile terminal 106, similarly to the example embodiment 1.

Specifically, the output unit 426 generates, as detection position information, information allowing determination of the position of a securing apparatus 103 detected by the detection unit 423, by analyzing the overall image SI. For example, the detection position information indicates the car number of a car including the securing apparatus 103 detected by the detection unit 423.

Physical Configuration of Fixed State Inspection System 400

The fixed state inspection system 400 may be physically configured similarly to the fixed state inspection system 100 according to the example embodiment 1 (see FIG. 5).

Fixed State Inspection Method

Figure 19:
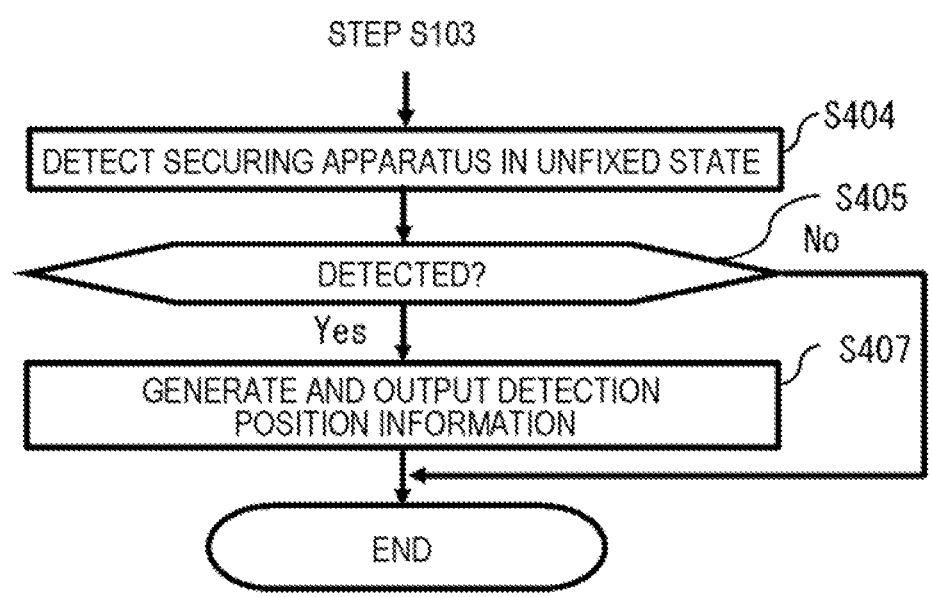
FIG. 19 is a flowchart of a fixed state inspection method according to the example embodiment 4 of the present invention.

A fixed state inspection method according to the example embodiment 4 of the present invention will be described with reference to FIG. 19. As illustrated in the diagram, in the fixed state inspection method according to the present example embodiment, Steps S404, S405, and S407 are performed after processing in Steps S101 to S103 similar to those in the example embodiment 1.

Detection processing (Step S404) is processing replacing the detection processing S104 according to the example embodiment 1. In the detection processing (Step S404), the detection unit 423 detects a securing apparatus 103 in the unfixed state in the freight train 101, based on an overall image SI acquired in Step S103.

For example, it is assumed as illustrated in FIG. 1 that a securing apparatus 103 provided at the front of the fourth car out of the securing apparatuses 103 provided in the freight train 101 is in the unfixed state, and the other securing apparatuses 103 are in the fixed state.

In this case, when information indicating the overall image SI is input to a learning model, the detection unit 123 detects a securing apparatus 103 in the unfixed state provided at the front of the fourth car and does not detect the other securing apparatuses 103 as securing apparatuses 103 in the unfixed state.

Figure 20:
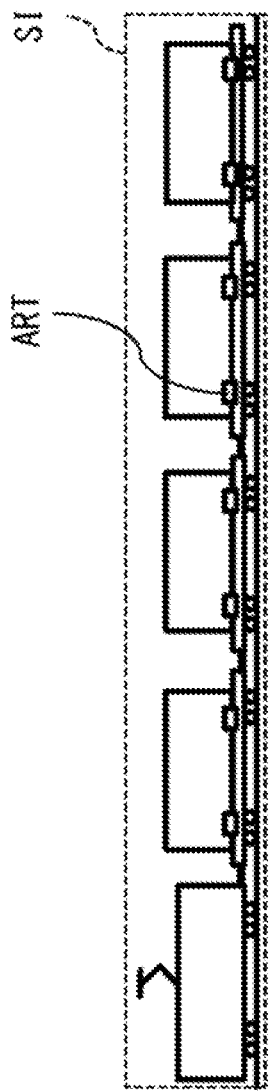
FIG. 20 is a diagram illustrating an example of a securing apparatus in an unfixed state being detected from an overall image SI.

Consequently, for example, an area ART occupied by the securing apparatus 103 in the unfixed state in the overall image SI is detected as a securing apparatus 103 in the unfixed state, as illustrated in FIG. 20. The area ART is hatched in FIG. 20.

In detection determination processing (Step S405), the output unit 426 determines whether a securing apparatus 103 in the unfixed state is detected in Step S404.

When determining that a securing apparatus 103 in the unfixed state is not detected (Step S405: No), the output unit 426 ends the fixed state inspection method. In this case, the output unit 126 may output information indicating the end of the fixed state inspection method to, for example, the mobile terminal 106, similarly to the example embodiment 1.

When determining that a securing apparatus 103 in the unfixed state is detected (Step S405: Yes), the output unit 426 performs detection position information generation processing (Step S407).

In Step S407, for example, the output unit 426 generates detection position information indicating the car number of a car including the securing apparatus 103 detected in Step S404, by analyzing the overall image SI. Specifically, by analyzing the overall image SI, the output unit 426 detects ends of cars in a sequential order from the front and determines the car number of the car including the area ART.

Figure 21:
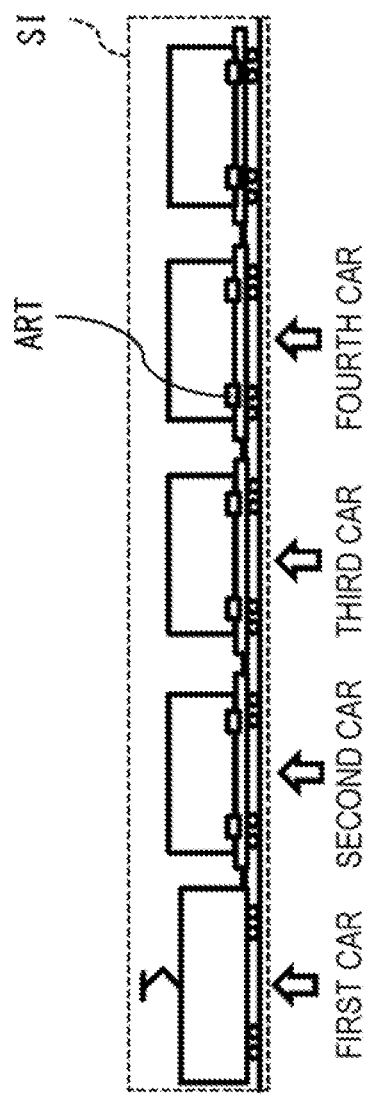
FIG. 21 is a diagram illustrating an example of a car number of a car being determined by determining car numbers of cars indicated in an overall image in a sequential order from the front, the car being indicated by an area ARD occupied by a detection frame image in the overall image SI.

For example, when the fourth car is determined as illustrated in FIG. 21 in a case that the hatched area ART in FIG. 20 is determined, the car includes the area ART. Therefore, the output unit 426 generates detection position information indicating the "fourth" as a car number and outputs the information to the mobile terminal 106.

Thus, the output unit 426 ends the fixed state inspection method.

The example embodiment 4 of the present invention has been described above. The present example embodiment also enables safer operation of freight trains, similarly to the example embodiment 1.

Example Embodiment 5

Functional Configuration of Fixed State Inspection System 500

Figure 22:
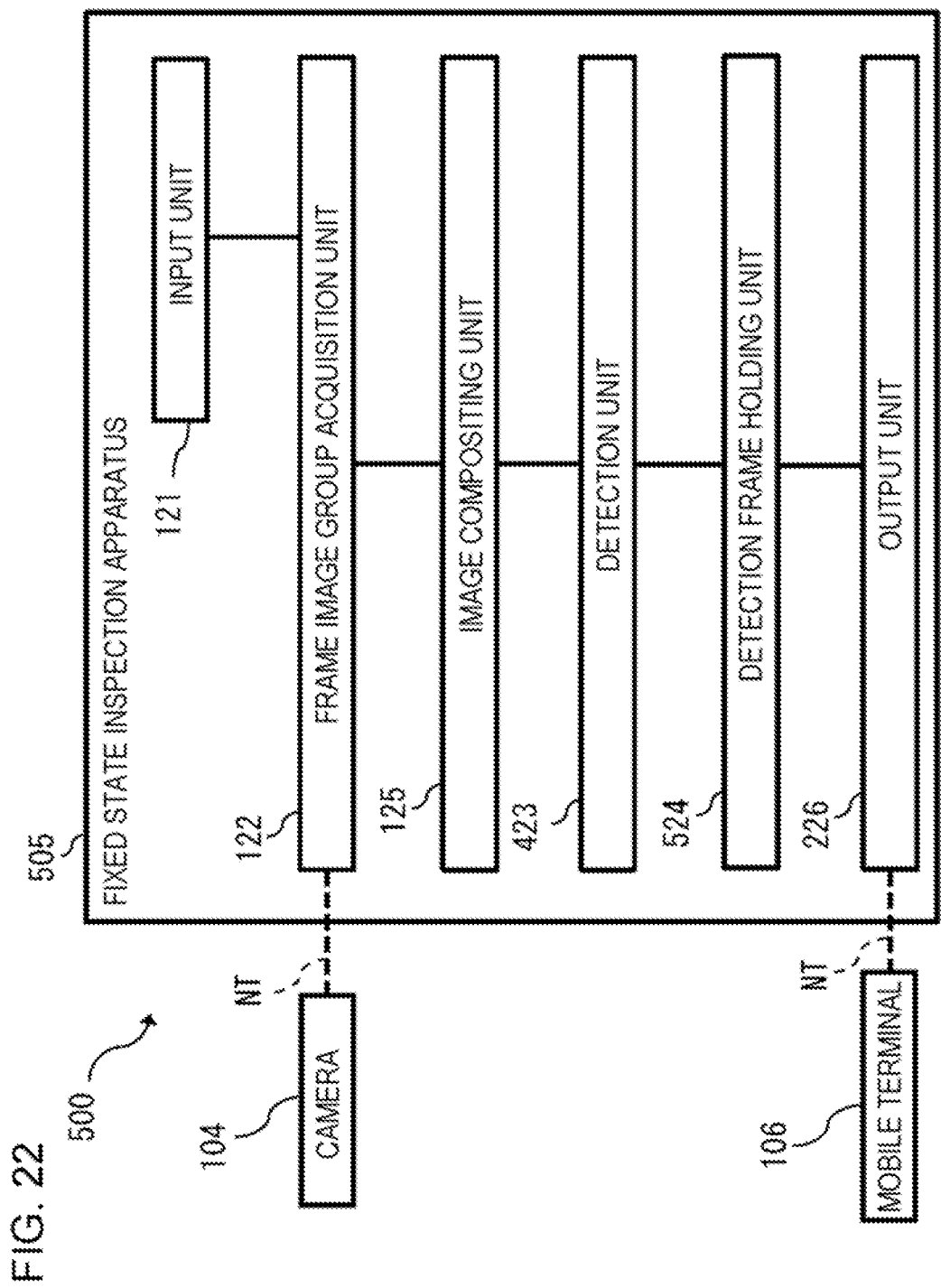
FIG. 22 is a diagram illustrating a functional configuration of a fixed state inspection system according to an example embodiment 5 of the present invention.

A fixed state inspection system 500 according to an example embodiment 5 of the present invention includes a camera 104 and a mobile terminal 106 that are similar to those according to the example embodiment 1, and a fixed state inspection apparatus 505 in place of the fixed state inspection apparatus 105 according to the example embodiment 1, as illustrated in FIG. 22.

The fixed state inspection apparatus 505 includes an output unit 226 similar to that according to the example embodiment 2 in place of the output unit 426 according to the example embodiment 4. The fixed state inspection apparatus 505 further includes a detection frame holding unit 524 characteristic of the present example embodiment.

Except for the above, the fixed state inspection apparatus 505 may be configured similarly to the fixed state inspection apparatus 405 according to the example embodiment 4.

When a securing apparatus 103 in the unfixed state is detected by a detection unit 423, the detection frame holding unit 524 determines a detection frame image, based on each of a plurality of frame images FR and an overall image SI. At this time, the detection frame image is determined as a frame image FR including the securing apparatus 103 detected by the detection unit 423. The detection frame holding unit 524 holds frame identification information of the determined detection frame image.

Physical Configuration of Fixed State Inspection System 500

The fixed state inspection system 500 may be physically configured similarly to the fixed state inspection system 100 according to the example embodiment 1 (see FIG. 5).

Fixed State Inspection Method

Figure 23:
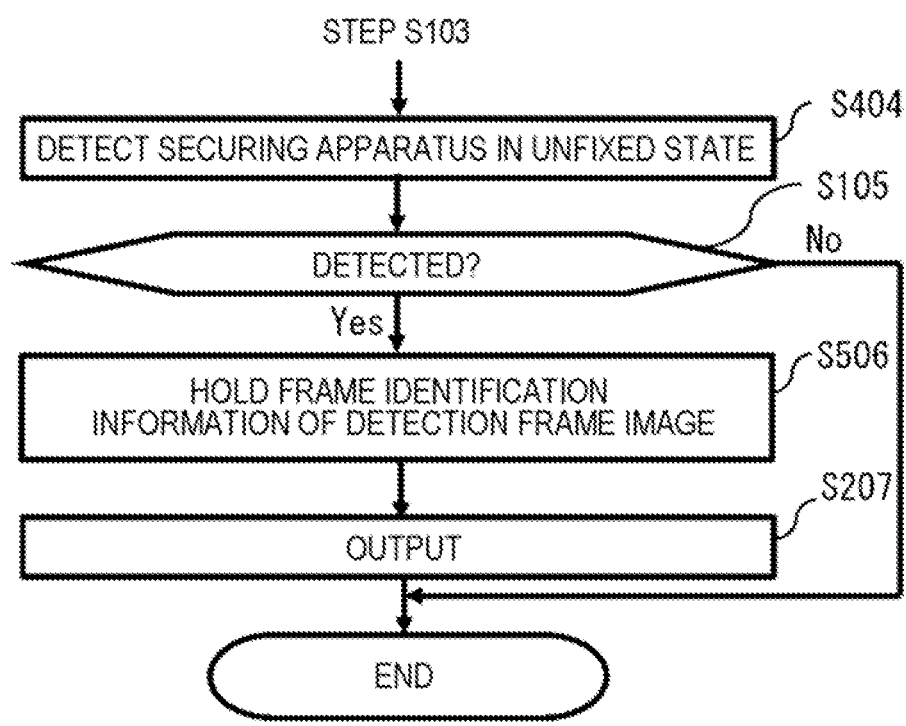
FIG. 23 is a flowchart of a fixed state inspection method according to the example embodiment 5 of the present invention.

A fixed state inspection method according to the example embodiment 5 of the present invention will be described with reference to FIG. 23.

As illustrated in the diagram, in the fixed state inspection method according to the present example embodiment, processing in Steps S101 to S103 similar to those in the example embodiment 1, Step S404 similar to that in the example embodiment 4, and Step S105 similar to that in the example embodiment 1 is performed. Detection determination processing according to the present example embodiment (Step S105) is performed by the detection frame holding unit 524 in place of the detection frame holding unit 124.

When determining that a securing apparatus 103 in the unfixed state is detected (Step S105: Yes), the detection frame holding unit 524 holds frame identification information of a detection frame image, as illustrated in the diagram (Step S506).

Specifically, the detection frame holding unit 524 checks each of a plurality of frame images FR against an overall image SI and determines a frame image FR including an area ART detected in Step S404 as a detection frame image. The detection frame holding unit 524 holds frame identification information of the determined detection frame image.

Subsequently, output processing (S207) similar to that according to the example embodiment 2 is performed, and the fixed state inspection method is ended.

The example embodiment 5 of the present invention has been described above. The present example embodiment also enables safer operation of freight trains, similarly to the example embodiment 1.

Example Embodiment 6

Functional Configuration of Fixed State Inspection System 600

Figure 24:
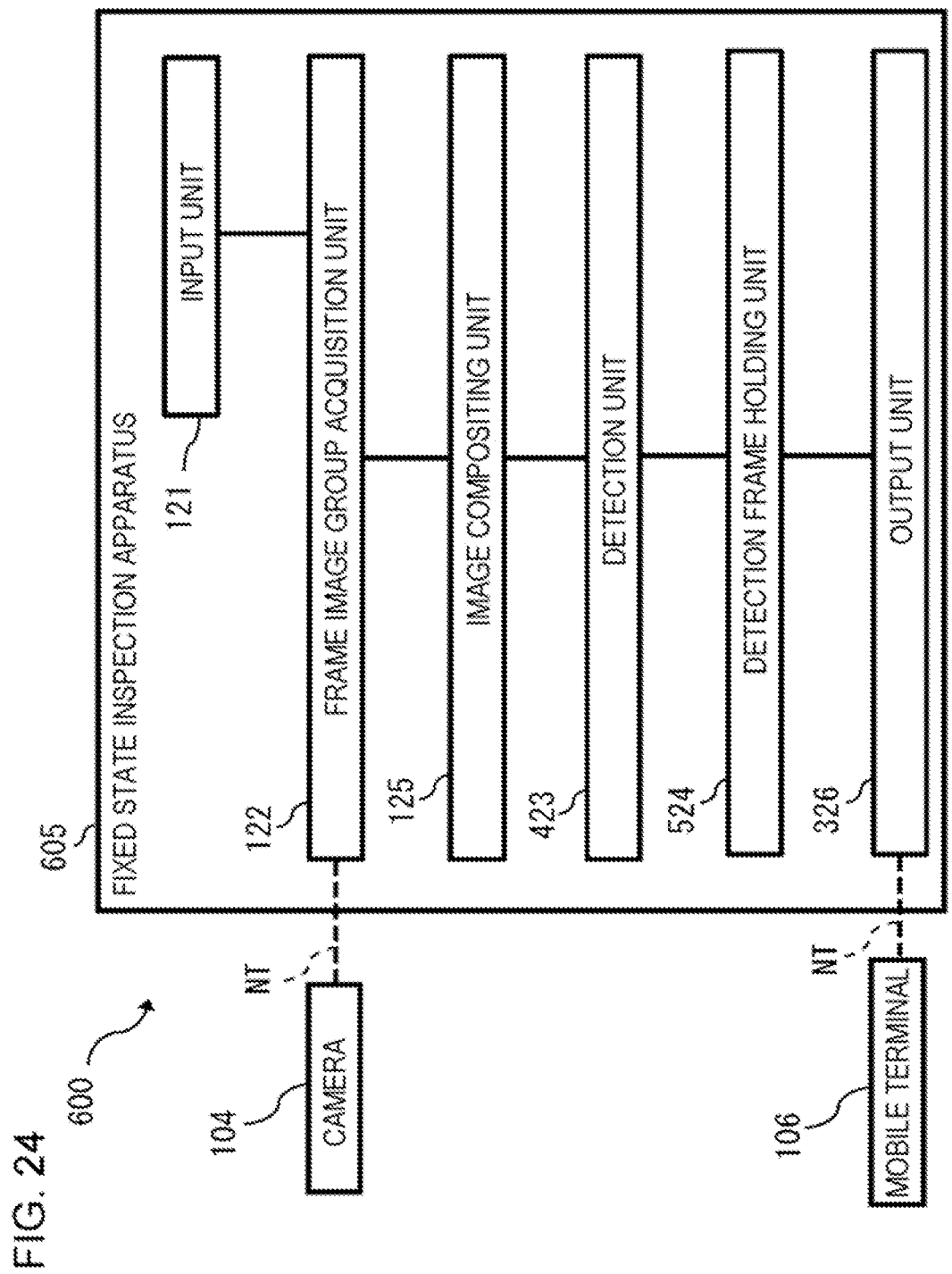
FIG. 24 is a diagram illustrating a functional configuration of a fixed state inspection system according to an example embodiment 6 of the present invention.

A fixed state inspection system 600 according to the example embodiment 6 of the present invention includes a camera 104 and a mobile terminal 106 that are similar to those according to the example embodiment 1, and a fixed state inspection apparatus 605 in place of the fixed state inspection apparatus 105 according to the example embodiment 1, as illustrated in FIG. 24.

The fixed state inspection apparatus 605 includes an output unit 326 similar to that according to the example embodiment 3 in place of the output unit 226 in the fixed state inspection apparatus 505 according to the example embodiment 5. Except for the above, the fixed state inspection apparatus 605 may be configured similarly to the fixed state inspection apparatus 505 according to the example embodiment 5.

Physical Configuration of Fixed State Inspection System 600

The fixed state inspection system 600 may be physically configured similarly to the fixed state inspection system 100 according to the example embodiment 1 (see FIG. 5).

Fixed State Inspection Method

Figure 25:
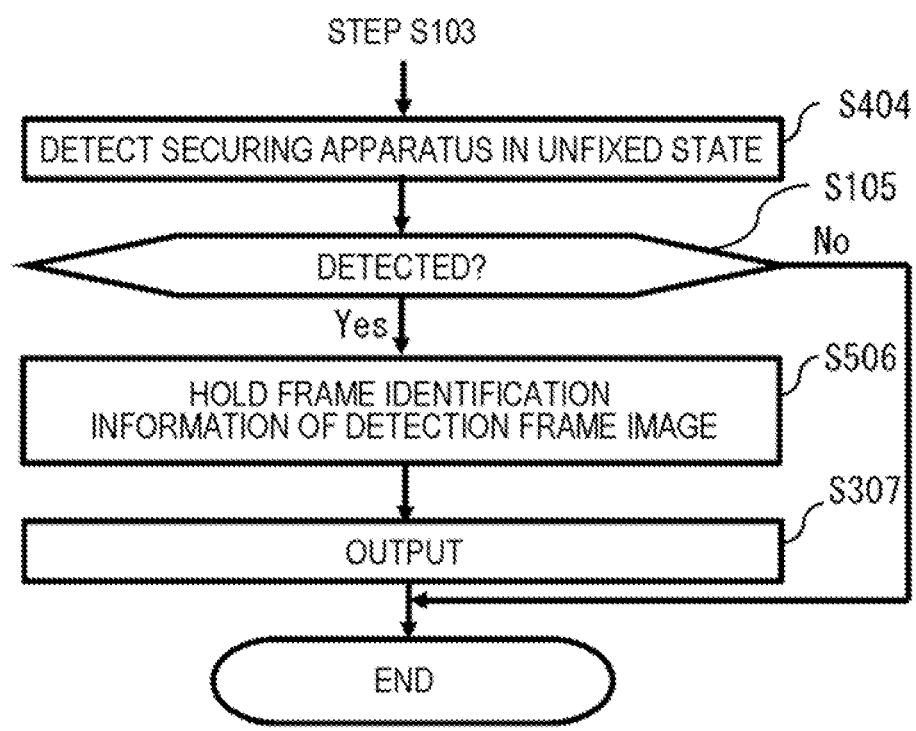
FIG. 25 is a flowchart of a fixed state inspection method according to the example embodiment 6 of the present invention.

A fixed state inspection method according to the example embodiment 6 of the present invention will be described with reference to FIG. 25. As illustrated in the diagram, in the fixed state inspection method according to the present example embodiment, output processing (Step S307) similar to that according to the example embodiment 3 is performed in place of the output processing (Step S207) in the fixed state inspection method according to the example embodiment 5. Except for the above, the fixed state inspection method according to the present example embodiment may be configured similarly to the fixed state inspection method according to the example embodiment 5.

The example embodiment 6 of the present invention has been described above. The present example embodiment also enables safer operation of freight trains, similarly to the example embodiment 1.

Example Embodiment 7

While an example of generating an overall image SI, based on frame image group information, and referring to the overall image SI in order to detect a securing apparatus 103 in the unfixed state or outputting detection position information indicating the position of the apparatus has been described in the example embodiments 1 to 6. However, an overall image SI may not be generated.

An example of detecting a securing apparatus 103 in the unfixed state and outputting detection position information indicating the position of the apparatus without generating an overall image SI will be described in the present example embodiment.

Functional Configuration of Fixed State Inspection System 700

Figure 26:
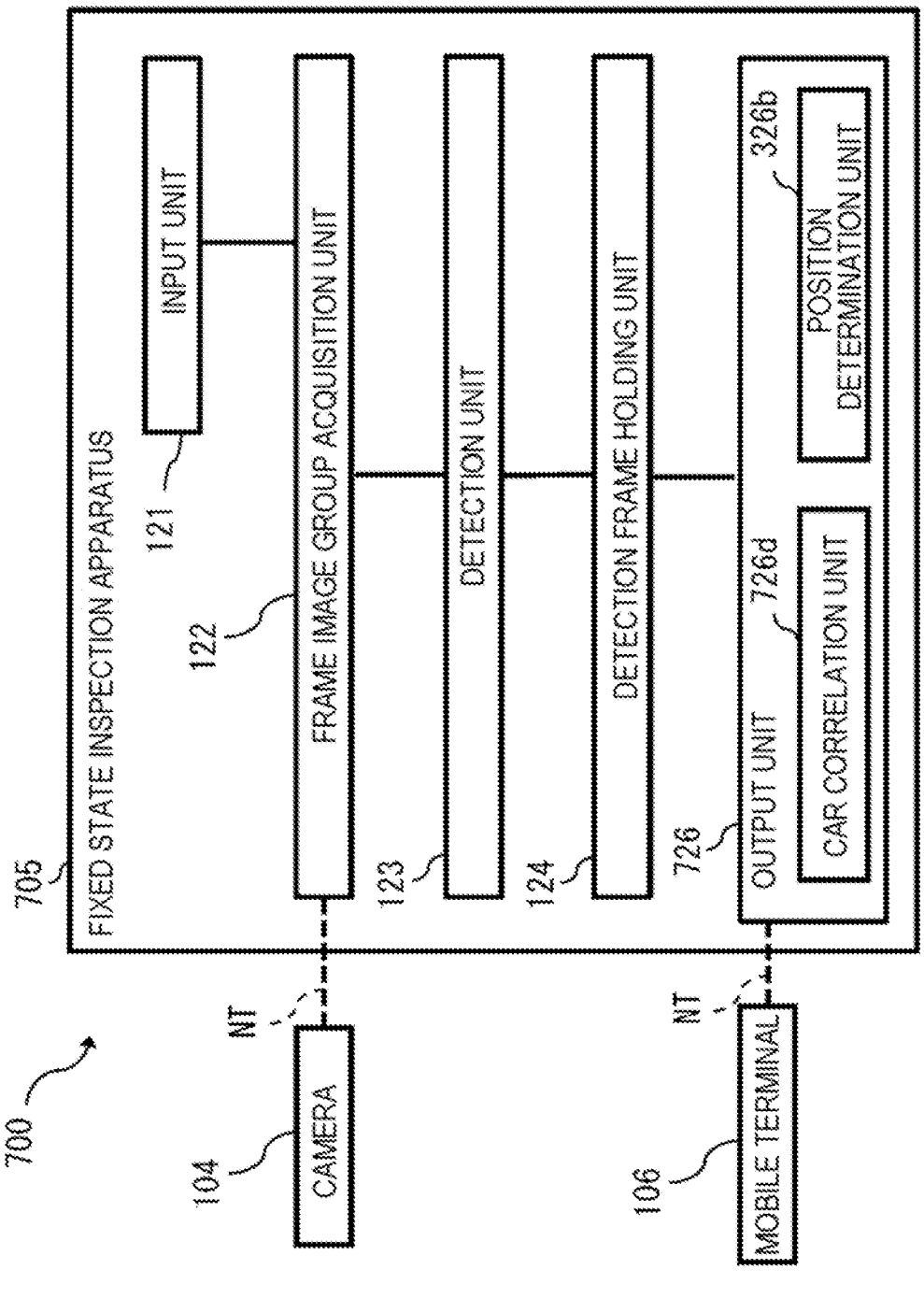
FIG. 26 is a diagram illustrating a functional configuration of a fixed state inspection system according to an example embodiment 7 of the present invention.

A fixed state inspection system 700 according to an example embodiment 7 of the present invention includes a camera 104 and a mobile terminal 106 that are similar to those according to the example embodiment 1, and a fixed state inspection apparatus 705 in place of the fixed state inspection apparatus 105 according to the example embodiment 1, as illustrated in FIG. 26.

The fixed state inspection apparatus 705 includes an input unit 121, a frame image group acquisition unit 122, a detection unit 123, and a detection frame holding unit 124 that are similar to those according to the example embodiment 1, and an output unit 726 characteristic of the present example embodiment.

The output unit 726 generates detection position information, based on a detection frame image and other frame images and outputs the information to, for example, the mobile terminal 106, similarly to the example embodiment 1.

Specifically, the output unit 726 includes a car correlation unit 726*d* and a position determination unit 326*b* similar to that according to the example embodiment 3. The car correlation unit 726*d* generates frame-car information (see FIG. 17), based on each of a plurality of frame images FR included in frame image group information.

Physical Configuration of Fixed State Inspection System 700

The fixed state inspection system 700 may be physically configured similarly to the fixed state inspection system 100 according to the example embodiment 1 (see FIG. 5).

Fixed State Inspection Method

Figure 27:
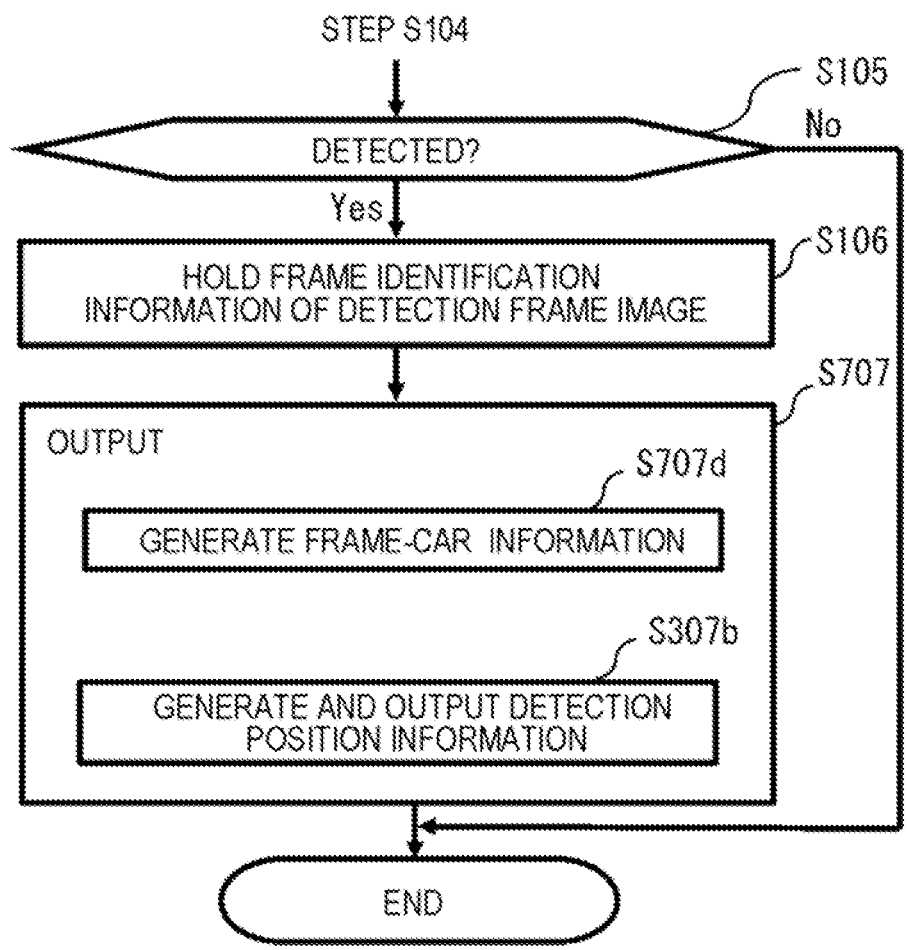
FIG. 27 is a flowchart of a fixed state inspection method according to the example embodiment 7 of the present invention.

A fixed state inspection method according to the example embodiment 7 of the present invention will be described with reference to FIG. 27. As illustrated in the diagram, the fixed state inspection method according to the present example embodiment includes output processing (Step S707) in place of the output processing (Step S107) in the fixed state inspection method according to the example embodiment 1. Except for the above, the fixed state inspection method according to the present example embodiment may be configured similarly to the fixed state inspection method according to the example embodiment 1.

The output processing (Step S707) includes Step S707*d* characteristic of the present example embodiment and detection position information generation processing (Step S307*b*) similar to that according to the example embodiment 3.

In frame-car information generation processing (Step S707*d*), the car correlation unit 726*d* generates frame-car information (see FIG. 17) by successively analyzing each of a plurality of frame images FR included in frame image group information.

For example, a plurality of frame images FR are successively analyzed in the order of image capture. The order of image capture is determined by frame identification information, according to the present example embodiment. Note that the frame image group information may include an image capture time associated with each frame image FR, and in this case, the order of image capture of a plurality of frame images FR may be determined by the image capture times.

For example, the car correlation unit 726*d* may detect ends of cars included in frame images FR being analysis targets and may determine the detected ends to be "the front end of the first car," "the rear end of the first car," "the front end of the second car," "the rear end of the second car," "the front end of the third car," . . . in a sequential order. Consequently, the car correlation unit 726*d* determines the car number of a car included in each frame image FR and generates frame-car information as illustrated in FIG. 17.

Subsequently, the position determination unit 326*b* executes the detection position information generation processing (Step S307*b*) similar to that according to the example embodiment 3 and then ends the fixed state inspection method.

The example embodiment 3 of the present invention has been described above. The present example embodiment also enables safer operation of freight trains, similarly to the example embodiment 1.

While the example embodiments of the present invention have been described above, the example embodiments may be modified as follows.

Modified Example 1

While an example of the position (detection position) of a securing apparatus 103 in the unfixed state being associated with the car number of a car including the securing apparatus 103 when the securing apparatus 103 is detected has been described in the example embodiments, determination of a detection position is not limited to the above.

A detection position may indicate a distance (in units of, for example, meters) from a predetermined reference point (such as the foremost end) in the freight train 101 toward a predetermined direction (such as toward the rear). Further, a car number as a detection position may be determined by dividing the distance from a predetermined reference point to a securing apparatus 103 in the unfixed state by the length of a car.

Such a detection position and distance may be determined by an output means, based on an image capture condition at image capture of a detection frame image. Then, the output means may output detection position information allowing determination of the determined position.

The image capture condition may include the operating velocity of the freight train 101 at image capture and an image capture period of a detection frame image. The image capture period is a period from a predetermined point in time to image capture point of a frame image FR and may be determined according to the image capture time of each frame image FR measured by a fixed state inspection apparatus. The operating velocity may be preset or may be input from the input unit 121 after image capture or the like.

Modified Example 2

While an example of detecting a securing apparatus 103 in the unfixed state by using a learning model learned by machine learning has been described in the example embodiment, the method of detecting a securing apparatus 103 in the unfixed state is not limited to the above.

For example, reference information indicating a securing apparatus 103 in the fixed state may be prepared in advance and may be held in a storage means. Then, a detection means may detect a fixing mechanism in the unfixed state in the freight train 101 by checking frame image group information against the reference information.

The above also allows automatic detection of a securing apparatus 103 in the unfixed state out of securing apparatuses 103 provided in the freight train 101 and allows a user to readily recognize the securing apparatus 103. Then, the user can operate the securing apparatus 103 in the unfixed state and set the apparatus to the fixed state. Accordingly, safer operation of freight trains can be achieved.

While the example embodiments of the present invention and the modified examples have been described above with reference to the drawings, the example embodiments and the modified examples are exemplifications of the present invention and may be modified as appropriate.

Further, while each of a plurality of flowcharts used in the aforementioned description describes a plurality of processes (processing) in a sequential order, an execution order of the processes is not limited to the described order. The order of the processes may be modified without affecting the contents. Further, the aforementioned example embodiments and modified examples may be combined without contradicting one another.

The aforementioned example embodiments may also be described in part or in whole as the following supplementary notes but are not limited thereto.

1. A fixed state inspection apparatus including:
    a frame image group acquisition means for acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;
    a detection means for detecting the fixing mechanism in an unfixed state different from the fixed state in the freight train, based on the frame image group information; and
    an output means for generating and outputting detection position information being information allowing determination of a position of the detected fixing mechanism in the freight train, based on a detection frame image being a frame image including the detected fixing mechanism.

2. The fixed state inspection apparatus according to 1 described above, wherein
    the output means outputs detection position information relating to a position of the detected fixing mechanism in the freight train, based on a detection frame image being a frame image including the detected fixing mechanism and another frame image.

3. The fixed state inspection apparatus according to 2 described above, further including
    an image compositing means for generating overall image information indicating an overall image including an image of a side part of the freight train over an entire length along the traveling direction, by compositing a plurality of frame images included in the frame image group information.

4. The fixed state inspection apparatus according to 3 described above, wherein
    the output means includes:
        a detection frame area determination means for determining an area occupied by the detection frame image in the overall image, based on the detection frame image and the overall image; and
        a position determination means for determining a car number of a car relating to the determined area, by analyzing the overall image, and outputting information indicating the car number as the detection position information.

5. The fixed state inspection apparatus according to 4 described above, wherein
    the detection frame area determination means determines an area occupied by the detection frame image in the overall image by checking the detection frame image against the overall image.

6. The fixed state inspection apparatus according to 4 described above, wherein
    the detection frame area determination means includes:
        an area correlation means for generating frame area information indicating an area occupied by each of the plurality of frame images in the overall image; and
        an area determination means for determining an area occupied by the detection frame image in the overall image, based on the frame area information.

7. The fixed state inspection apparatus according to 3 described above, wherein
    the output means includes:
        an area correlation means for generating frame area information indicating an area occupied by each of the plurality of frame images in the overall image;
        a car number determination means for determining a car number of each car in the overall image by analyzing the overall image;
        a car correlation means for generating frame-car information indicating a car number of a car indicated in each of the plurality of frame images, based on the determined car number and the frame area information; and
        a position determination means for determining a car number of a car relating to the detection frame image, based on the frame-car information, and outputting information indicating the car number as the detection position information.

8. The fixed state inspection apparatus according to any one of 3 to 7 described above, wherein
    the detection means detects the fixing mechanism in the unfixed state, based on an overall image acquired from the frame image group information.

9. The fixed state inspection apparatus according to 3 described above, wherein
the detection means detects the fixing mechanism in the unfixed state, based on an overall image acquired from the frame image group information, and
the output means outputs information indicating a car number of a car including the detected fixing mechanism as the detection position information, by analyzing the overall image.

10. The fixed state inspection apparatus according to 3 described above, wherein
the output means includes a position determination means for determining a car number of a car relating to the detection frame image, by successively analyzing the plurality of frame images, and outputting information indicating the car number as the detection position information.

11. The fixed state inspection apparatus according to 10 described above, wherein
the output means includes:
a car correlation means for generating frame-car information indicating a car number of a car indicated in each of the plurality of frame images, by successively analyzing the plurality of frame images; and
a position determination means for determining a car number of a car relating to the detection frame image, based on the frame-car information, and outputting information indicating the car number as the detection position information.

12. The fixed state inspection apparatus according to any one of 1 to 11 described above, wherein
the detection means detects the fixing mechanism in the unfixed state in the freight train by inputting the frame image group information to a learned learning model undergoing machine learning for detecting a fixing mechanism in the unfixed state.

13. The fixed state inspection apparatus according to 12 described above, wherein
the detection means detects the fixing mechanism in the unfixed state in the freight train by inputting the frame image group information and an image capture environment to a learned learning model undergoing machine learning for detecting a fixing mechanism in the unfixed state in a plurality of the image capture environments.

14. The fixed state inspection apparatus according to 13 described above, wherein
the image capture environment is set based on a time period for image capture or weather at image capture.

15. The fixed state inspection apparatus according to any one of 1 to 11 described above, wherein
the detection means detects the fixing mechanism in the unfixed state in the freight train by checking the frame image group information against reference information indicating the fixing mechanism in the fixed state.

16. The fixed state inspection apparatus according to 1 described above, wherein
the output means determines a position of the detected fixing mechanism in the freight train, based on an image capture condition at image capture of the detection frame image, and outputs detection position information allowing determination of the determined position.

17. The fixed state inspection apparatus according to 16 described above, wherein
the image capture condition includes an operating velocity of the freight train and an image capture period being a period from a predetermined point in time to an image capture point of the detection frame image.

18. A fixed state inspection system including:
the fixed state inspection apparatus according to any one of 1 to 17 described above; and
an image capture means for capturing an image of the freight train, wherein
the frame image group acquisition means acquires the frame image group information from the image capture means.

19. The fixed state inspection system according to 18 described above, wherein
the image capture means is provided in such a way as to move relatively to the freight train on one or both sides of the freight train along the traveling direction.

20. A fixed state inspection method including:
acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;
detecting the fixing mechanism in an unfixed state different from the fixed state in the freight train, based on the frame image group information; and
outputting detection position information relating to a position of the detected fixing mechanism in the freight train, based on a detection frame image being a frame image including the detected fixing mechanism.

21. A program for causing a computer to function as:
a frame image group acquisition means for acquiring frame image group information being information including a plurality of frame images acquired by continuously capturing images of a freight train along a traveling direction, at least one of the frame images including a fixing mechanism that is provided in association with a container in the freight train and can switch between a fixed state and a released state between members;
a detection means for detecting the fixing mechanism in an unfixed state different from the fixed state in the freight train, based on the frame image group information; and
an output means for outputting detection position information relating to a position of the detected fixing mechanism in the freight train, based on a detection frame image being a frame image including the detected fixing mechanism.

The invention claimed is:

1. A fixed state inspection apparatus comprising:
at least one memory configured to store instructions; and
at least one processor configured to execute the instructions to:
acquire frame image group information being information including a plurality of frame images acquired by continuously capturing images of a freight train along a traveling direction, at least one of the frame images including a fixing mechanism that is provided for fixing a container and a flatcar in the freight train and can switch between a fixed state and a released state between the container and the flatcar;

detect the fixing mechanism in an unfixed state different from the fixed state in the freight train by processing at least one image obtained from the frame image group information; and generate and output detection position information being information allowing determination of a position of the detected fixing mechanism in the freight train, based on a detection frame image being a frame image including the detected fixing mechanism.

2. The fixed state inspection apparatus according to claim 1, wherein the detection position information relating to a position of the detected fixing mechanism in the freight train is outputted, based on the detection frame image being a frame image including the detected fixing mechanism and another frame image.

3. The fixed state inspection apparatus according to claim 2, wherein the at least one processor configured further to execute the instructions to generate overall image information indicating an overall image including an image of a side part of the freight train over an entire length along the traveling direction, by compositing a plurality of frame images included in the frame image group information.

4. The fixed state inspection apparatus according to claim 3, wherein outputting the detection position information includes:
determining an area occupied by the detection frame image in the overall image, based on the detection frame image and the overall image;
determining a car number of a car relating to the determined area, by analyzing the overall image, and
outputting information indicating the car number as the detection position information.

5. The fixed state inspection apparatus according to claim 4, wherein the area occupied by the detection frame image in the overall image is determined by checking the detection frame image against the overall image.

6. The fixed state inspection apparatus according to claim 4, wherein determining the area occupied by the detection frame image in the overall image includes:
generating frame area information indicating an area occupied by each of the plurality of frame images in the overall image; and
determining the area occupied by the detection frame image in the overall image, based on the frame area information.

7. The fixed state inspection apparatus according to claim 3, wherein outputting the detection position information includes:
generating frame area information indicating an area occupied by each of the plurality of frame images in the overall image;
determining a car number of each car in the overall image by analyzing the overall image;
generating frame-car information indicating a car number of a car indicated in each of the plurality of frame images, based on the determined car number and the frame area information; and
determining a car number of a car relating to the detection frame image, based on the frame-car information, and outputting information indicating the car number as the detection position information.

8. The fixed state inspection apparatus according to claim 3, wherein the fixing mechanism in the unfixed state is detected, based on an overall image acquired from the frame image group information.

9. The fixed state inspection apparatus according to claim 3, wherein the fixing mechanism in the unfixed state is detected, based on an overall image acquired from the frame image group information, and the detection position information is information indicating a car number of a car including the detected fixing mechanism, obtained by analyzing the overall image.

10. The fixed state inspection apparatus according to claim 3, wherein outputting the detection position information includes:
determining a car number of a car relating to the detection frame image, by successively analyzing the plurality of frame images, and outputting information indicating the car number as the detection position information.

11. The fixed state inspection apparatus according to claim 10, wherein outputting the detection position information includes:
generating frame-car information indicating a car number of a car indicated in each of the plurality of frame images, by successively analyzing the plurality of frame images;
determining a car number of a car relating to the detection frame image, based on the frame-car information, and outputting information indicating the car number as the detection position information.

12. The fixed state inspection apparatus according to claim 1, wherein the fixing mechanism in the unfixed state in the freight train is detected by inputting the frame image group information to a learned learning model undergoing machine learning for detecting a fixing mechanism in the unfixed state.

13. The fixed state inspection apparatus according to claim 12, wherein the fixing mechanism in the unfixed state in the freight train is detected by inputting the frame image group information and an image capture environment to a learned learning model undergoing machine learning for detecting a fixing mechanism in the unfixed state in a plurality of the image capture environments.

14. The fixed state inspection apparatus according to claim 13, wherein the image capture environment is set based on a time period for image capture or weather at image capture.

15. The fixed state inspection apparatus according to claim 1, wherein the fixing mechanism in the unfixed state in the freight train is detected by checking the frame image group information against reference information indicating the fixing mechanism in the fixed state.

16. The fixed state inspection apparatus according to claim 1, wherein outputting the detection position information includes:
determining a position of the detected fixing mechanism in the freight train, based on an image capture condition at image capture of the detection frame image, and outputting the detection position information allowing determination of the determined position.

17. A fixed state inspection system comprising:

the fixed state inspection apparatus according to claim 1; and image capture apparatus for capturing an image of the freight train, wherein the frame image group information is acquired from the image capture apparatus.

18. The fixed state inspection system according to claim 17, wherein the image capture apparatus is provided in such a way as to move relatively to the freight train on one or both sides of the freight train along the traveling direction.

19. A fixed state inspection method comprising:

acquiring frame image group information being information including a plurality of frame images acquired by continuously capturing images of a freight train along a traveling direction, at least one of the frame images including a fixing mechanism that is provided for fixing a container and a flatcar in the freight train and can switch between a fixed state and a released state between the container and the flatcar;

detecting the fixing mechanism in an unfixed state different from the fixed state in the freight train, by processing at least one image obtained from the frame image group information; and outputting detection position information relating to a position of the detected fixing mechanism in the freight train, based on a detection frame image being a frame image including the detected fixing mechanism.

20. A non-transitory computer readable medium having recorded thereon a program for causing a computer to execute:

acquiring frame image group information being information including a plurality of frame images acquired by continuously capturing images of a freight train along a traveling direction, at least one of the frame images including a fixing mechanism that is provided for fixing a container and a flatcar in the freight train and can switch between a fixed state and a released state between the container and the flatcar;

detecting the fixing mechanism in an unfixed state different from the fixed state in the freight train, by processing at least one image obtained from the frame image group information; and outputting detection position information relating to a position of the detected fixing mechanism in the freight train, based on a detection frame image being a frame image including the detected fixing mechanism.

* * * * *